United States Patent
Kummer et al.

(10) Patent No.: US 9,628,838 B2
(45) Date of Patent: Apr. 18, 2017

(54) SATELLITE-BASED CONTENT TARGETING

(71) Applicant: EchoStar Technologies, L.L.C., Englewood, CO (US)

(72) Inventors: David Kummer, Highlands Ranch, CO (US); Henry Gregg Martch, Parker, CO (US)

(73) Assignee: Echostar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/043,617

(22) Filed: Oct. 1, 2013

(65) Prior Publication Data

US 2015/0095948 A1   Apr. 2, 2015

(51) Int. Cl.
| | | |
|---|---|---|
| H04N 7/10 | (2006.01) | |
| H04N 21/2668 | (2011.01) | |
| H04N 21/61 | (2011.01) | |
| H04H 20/74 | (2008.01) | |
| H04H 20/10 | (2008.01) | |
| H04H 60/13 | (2008.01) | |

(52) U.S. Cl.
CPC ........ *H04N 21/2668* (2013.01); *H04H 20/74* (2013.01); *H04N 21/6143* (2013.01); *H04H 20/106* (2013.01); *H04H 60/13* (2013.01)

(58) Field of Classification Search
None
See application file for complete search history.

(56) References Cited

U.S. PATENT DOCUMENTS

| | | |
|---|---|---|
| 4,706,121 A | 11/1987 | Young |
| 4,723,246 A | 2/1988 | Weldon, Jr. |
| 4,802,215 A | 1/1989 | Mason |
| 5,187,589 A | 2/1993 | Kono et al. |
| 5,335,277 A | 8/1994 | Harvey et al. |

(Continued)

FOREIGN PATENT DOCUMENTS

| | | |
|---|---|---|
| CN | 1595975 A | 3/2005 |
| CN | 1615017 A | 5/2005 |

(Continued)

OTHER PUBLICATIONS

International Search Report and Written Opinion of PCT/US2013/031432 mailed May 28, 2013, 10 pages.

(Continued)

*Primary Examiner* — Brian Yenke
*Assistant Examiner* — Samira Monshi
(74) *Attorney, Agent, or Firm* — Kilpatrick Townsend & Stockton LLP

(57) ABSTRACT

Various arrangements are present for targeting content in a television distribution system. A multiregional television channel may be transmitted to television receivers. A plurality of regional television channels may also be transmitted. Each regional television channel of the plurality of regional television channels may be broadcast to geographically smaller regions than the multiregional television channel. Content among the regional television channels may vary. Data may be transmitted to the television receivers that causes the television receivers to output for presentation as a single television channel: content from the multiregional television channel and content from a regional television channel corresponding to the television receiver's location.

20 Claims, 10 Drawing Sheets

(56) References Cited

U.S. PATENT DOCUMENTS

| | | |
|---|---|---|
| 5,483,277 A | 1/1996 | Granger |
| 5,488,658 A | 1/1996 | Hirashima |
| 5,541,738 A | 7/1996 | Mankovitz |
| 5,642,153 A | 6/1997 | Chaney et al. |
| 5,682,597 A | 10/1997 | Ganek et al. |
| 5,684,969 A | 11/1997 | Ishida |
| 5,724,646 A | 3/1998 | Ganek et al. |
| 5,805,763 A | 9/1998 | Lawler et al. |
| 5,974,218 A | 10/1999 | Nagasaka et al. |
| 6,049,333 A | 4/2000 | LaJoie et al. |
| 6,263,504 B1 | 7/2001 | Ebisawa |
| 6,453,115 B1 | 9/2002 | Boyle |
| 6,628,891 B1 | 9/2003 | Vantalon et al. |
| 6,701,528 B1 | 3/2004 | Arsenault et al. |
| 6,766,523 B2 | 7/2004 | Herley |
| 6,798,971 B2 | 9/2004 | Potrebic |
| 6,938,208 B2 | 8/2005 | Reichardt |
| 7,024,676 B1 | 4/2006 | Klopfenstein |
| 7,409,140 B2 | 8/2008 | Rodriguez et al. |
| 7,487,529 B1 | 2/2009 | Orlick |
| 7,490,169 B1 | 2/2009 | Ogdon et al. |
| 7,493,312 B2 | 2/2009 | Liu et al. |
| 7,505,081 B2 | 3/2009 | Eshleman |
| 7,542,656 B2 | 6/2009 | Cho et al. |
| 7,577,751 B2 | 8/2009 | Vinson et al. |
| 7,590,993 B1 | 9/2009 | Hendricks et al. |
| 7,684,672 B2 | 3/2010 | Matoba |
| 7,715,552 B2 | 5/2010 | Pinder et al. |
| 7,730,517 B1 | 6/2010 | Rey et al. |
| 7,739,711 B2 | 6/2010 | Finseth et al. |
| 7,760,986 B2 | 7/2010 | Beuque |
| 7,804,861 B2 | 9/2010 | Kim |
| 7,848,618 B2 | 12/2010 | Potrebic et al. |
| 7,856,557 B2 | 12/2010 | Beuque |
| 7,926,078 B2 | 4/2011 | Arsenault et al. |
| 7,929,697 B2 | 4/2011 | McNeely et al. |
| 7,962,937 B2 | 6/2011 | Cho et al. |
| 8,006,268 B2 | 8/2011 | Sloo |
| 8,201,194 B2 | 6/2012 | Wijnands et al. |
| 8,321,466 B2 | 11/2012 | Black et al. |
| 8,364,671 B1 | 1/2013 | Sinton et al. |
| 8,437,622 B2 | 5/2013 | Casagrande |
| 8,447,170 B2 | 5/2013 | Casagrande |
| 8,566,873 B2 | 10/2013 | Sie et al. |
| 8,584,167 B2 | 11/2013 | Vanduyn |
| 8,606,088 B2 | 12/2013 | Kummer et al. |
| 8,627,349 B2 | 1/2014 | Kirby et al. |
| 8,660,412 B2 | 2/2014 | Kummer et al. |
| 8,763,027 B2 | 6/2014 | Martch |
| 8,774,608 B2 | 7/2014 | Kummer et al. |
| 8,819,722 B2 | 8/2014 | Kummer et al. |
| 8,819,761 B2 | 8/2014 | Minnick |
| 8,850,476 B2 | 9/2014 | VanDuyn et al. |
| 8,867,893 B2 | 10/2014 | Kirby |
| 8,959,544 B2 | 2/2015 | Kummer et al. |
| 8,959,566 B2 | 2/2015 | Kummer |
| 8,989,562 B2 | 3/2015 | Kummer et al. |
| 8,997,153 B2 | 3/2015 | Templeman |
| 9,031,385 B2 | 5/2015 | Casagrande et al. |
| 9,055,274 B2 | 6/2015 | Casagrande |
| 9,088,763 B2 | 7/2015 | Martch et al. |
| 9,113,222 B2 | 8/2015 | VanDuyn |
| 9,177,605 B2 | 11/2015 | Minnick et al. |
| 9,177,606 B2 | 11/2015 | Kirby |
| 9,185,331 B2 | 11/2015 | Martch et al. |
| 9,191,694 B2 | 11/2015 | Casagrande |
| 9,202,524 B2 | 12/2015 | Martch et al. |
| 9,264,779 B2 | 2/2016 | Kirby et al. |
| 9,269,397 B2 | 2/2016 | Casagrande et al. |
| 9,349,412 B2 | 5/2016 | Templeman |
| 9,350,937 B2 | 5/2016 | Kummer et al. |
| 9,357,159 B2 | 5/2016 | Martch et al. |
| 9,361,940 B2 | 6/2016 | Minnick |
| 9,412,413 B2 | 8/2016 | Martch |
| 2001/0028782 A1 | 10/2001 | Ohno et al. |
| 2001/0033736 A1 | 10/2001 | Yap et al. |
| 2001/0034787 A1 | 10/2001 | Takao et al. |
| 2002/0044658 A1 | 4/2002 | Wasilewski et al. |
| 2002/0054752 A1 | 5/2002 | Wood et al. |
| 2002/0055343 A1 | 5/2002 | Stetzler et al. |
| 2002/0087979 A1 | 7/2002 | Dudkiewicz et al. |
| 2002/0087983 A1 | 7/2002 | Son et al. |
| 2002/0092021 A1 | 7/2002 | Yap et al. |
| 2002/0095510 A1 | 7/2002 | Sie et al. |
| 2002/0097340 A1 | 7/2002 | Takagi et al. |
| 2002/0116705 A1 | 8/2002 | Perlman |
| 2002/0120925 A1 | 8/2002 | Logan |
| 2002/0126221 A1* | 9/2002 | Link ................. H04N 5/50 348/571 |
| 2002/0141431 A1 | 10/2002 | Tripathy |
| 2002/0144259 A1 | 10/2002 | Gutta et al. |
| 2002/0144266 A1 | 10/2002 | Goldman et al. |
| 2002/0152299 A1 | 10/2002 | Traversat et al. |
| 2002/0164147 A1 | 11/2002 | Suda |
| 2002/0168178 A1 | 11/2002 | Rodriguez et al. |
| 2002/0174430 A1 | 11/2002 | Ellis et al. |
| 2002/0184638 A1 | 12/2002 | Agnihotri et al. |
| 2002/0188943 A1 | 12/2002 | Freeman et al. |
| 2003/0005454 A1 | 1/2003 | Rodriguez et al. |
| 2003/0026423 A1 | 2/2003 | Unger et al. |
| 2003/0078930 A1 | 4/2003 | Surcouf et al. |
| 2003/0097659 A1 | 5/2003 | Goldman |
| 2003/0110514 A1 | 6/2003 | West et al. |
| 2003/0149988 A1 | 8/2003 | Ellis et al. |
| 2003/0152360 A1 | 8/2003 | Mukai et al. |
| 2003/0156826 A1 | 8/2003 | Sonoda et al. |
| 2003/0177492 A1 | 9/2003 | Kanou |
| 2003/0177495 A1 | 9/2003 | Needham et al. |
| 2003/0200548 A1 | 10/2003 | Baran et al. |
| 2003/0208763 A1 | 11/2003 | McElhatten et al. |
| 2003/0208767 A1 | 11/2003 | Williamson et al. |
| 2003/0226150 A1 | 12/2003 | Berberet et al. |
| 2004/0001087 A1 | 1/2004 | Warmus et al. |
| 2004/0003118 A1* | 1/2004 | Brown ................. G06Q 30/02 709/246 |
| 2004/0015992 A1 | 1/2004 | Hasegawa et al. |
| 2004/0015999 A1 | 1/2004 | Carlucci et al. |
| 2004/0078829 A1 | 4/2004 | Patel et al. |
| 2004/0080672 A1 | 4/2004 | Kessler et al. |
| 2004/0103428 A1 | 5/2004 | Seok et al. |
| 2004/0128682 A1* | 7/2004 | Liga et al. ................. 725/35 |
| 2004/0133923 A1 | 7/2004 | Watson et al. |
| 2004/0162871 A1 | 8/2004 | Pabla et al. |
| 2004/0218905 A1 | 11/2004 | Green et al. |
| 2004/0242150 A1* | 12/2004 | Wright ................. H04N 7/20 455/3.02 |
| 2004/0268387 A1 | 12/2004 | Wendling |
| 2005/0002640 A1 | 1/2005 | Putterman et al. |
| 2005/0034171 A1 | 2/2005 | Benya |
| 2005/0083865 A1 | 4/2005 | Ashley et al. |
| 2005/0120049 A1 | 6/2005 | Kanegae et al. |
| 2005/0125683 A1 | 6/2005 | Matsuyama et al. |
| 2005/0147383 A1 | 7/2005 | Ihara |
| 2005/0180568 A1 | 8/2005 | Krause |
| 2005/0229213 A1 | 10/2005 | Ellis et al. |
| 2005/0237435 A1 | 10/2005 | Potrebic et al. |
| 2005/0271365 A1 | 12/2005 | Hisatomi |
| 2005/0273819 A1 | 12/2005 | Knudson et al. |
| 2005/0281531 A1 | 12/2005 | Unmehopa |
| 2006/0010464 A1 | 1/2006 | Azami |
| 2006/0020962 A1 | 1/2006 | Stark et al. |
| 2006/0056800 A1 | 3/2006 | Shimagami et al. |
| 2006/0075434 A1 | 4/2006 | Chaney et al. |
| 2006/0080716 A1 | 4/2006 | Nishikawa et al. |
| 2006/0085828 A1 | 4/2006 | Dureau et al. |
| 2006/0120523 A1 | 6/2006 | Kurotaki |
| 2006/0206819 A1 | 9/2006 | Tsuji et al. |
| 2006/0212900 A1 | 9/2006 | Ismail et al. |
| 2006/0215993 A1 | 9/2006 | Yamada |
| 2006/0257099 A1 | 11/2006 | Potrebic et al. |
| 2006/0274208 A1 | 12/2006 | Pedlow, Jr. |
| 2007/0016546 A1 | 1/2007 | De Vorchik et al. |
| 2007/0039032 A1 | 2/2007 | Goldey et al. |
| 2007/0061378 A1 | 3/2007 | Lee et al. |

(56) References Cited

U.S. PATENT DOCUMENTS

| | | |
|---|---|---|
| 2007/0154163 A1 | 7/2007 | Cordray |
| 2007/0157248 A1 | 7/2007 | Ellis |
| 2007/0157253 A1 | 7/2007 | Ellis et al. |
| 2007/0165855 A1 | 7/2007 | Inui |
| 2007/0183745 A1 | 8/2007 | White |
| 2007/0192586 A1 | 8/2007 | McNeely |
| 2007/0204288 A1 | 8/2007 | Candelore |
| 2007/0234395 A1 | 10/2007 | Dureau et al. |
| 2007/0250856 A1* | 10/2007 | Leavens et al. ............... 725/36 |
| 2007/0258596 A1 | 11/2007 | Kahn et al. |
| 2008/0022347 A1 | 1/2008 | Cohen |
| 2008/0044158 A1 | 2/2008 | Kido |
| 2008/0046929 A1 | 2/2008 | Cho et al. |
| 2008/0052743 A1 | 2/2008 | Moore |
| 2008/0074547 A1 | 3/2008 | Ida |
| 2008/0092164 A1 | 4/2008 | Agarwal et al. |
| 2008/0092181 A1 | 4/2008 | Britt |
| 2008/0101760 A1 | 5/2008 | Waller |
| 2008/0104534 A1 | 5/2008 | Park et al. |
| 2008/0127253 A1 | 5/2008 | Zhang et al. |
| 2008/0137850 A1 | 6/2008 | Mamidwar |
| 2008/0141322 A1 | 6/2008 | Jang et al. |
| 2008/0144747 A1 | 6/2008 | Tomizawa |
| 2008/0152039 A1 | 6/2008 | Shah et al. |
| 2008/0184327 A1 | 7/2008 | Ellis et al. |
| 2008/0216119 A1 | 9/2008 | Pfeffer et al. |
| 2008/0216136 A1 | 9/2008 | Pfeffer et al. |
| 2008/0222678 A1 | 9/2008 | Burke et al. |
| 2008/0222681 A1 | 9/2008 | Kwon |
| 2008/0271077 A1 | 10/2008 | Kim et al. |
| 2008/0273698 A1 | 11/2008 | Manders et al. |
| 2008/0273856 A1 | 11/2008 | Bumgardner |
| 2008/0276284 A1 | 11/2008 | Bumgardner et al. |
| 2008/0288461 A1 | 11/2008 | Glennon et al. |
| 2008/0291206 A1 | 11/2008 | Uchimura et al. |
| 2008/0298585 A1 | 12/2008 | Maillard et al. |
| 2008/0301740 A1 | 12/2008 | Tsutsui |
| 2008/0307217 A1 | 12/2008 | Yukimatsu et al. |
| 2009/0025027 A1 | 1/2009 | Craner |
| 2009/0051579 A1 | 2/2009 | Inaba et al. |
| 2009/0067621 A9 | 3/2009 | Wajs |
| 2009/0080930 A1 | 3/2009 | Shinotsuka et al. |
| 2009/0100466 A1 | 4/2009 | Migos |
| 2009/0110367 A1 | 4/2009 | Fukui |
| 2009/0129741 A1 | 5/2009 | Kim |
| 2009/0129749 A1 | 5/2009 | Oyamatsu et al. |
| 2009/0136206 A1 | 5/2009 | Aisu |
| 2009/0150941 A1 | 6/2009 | Riedl et al. |
| 2009/0165057 A1 | 6/2009 | Miller et al. |
| 2009/0172722 A1 | 7/2009 | Kahn et al. |
| 2009/0178098 A1 | 7/2009 | Westbrook et al. |
| 2009/0210912 A1 | 8/2009 | Cholas et al. |
| 2009/0235298 A1 | 9/2009 | Carlberg et al. |
| 2009/0254962 A1 | 10/2009 | Hendricks et al. |
| 2009/0260038 A1 | 10/2009 | Acton et al. |
| 2009/0320073 A1 | 12/2009 | Reisman |
| 2009/0320084 A1 | 12/2009 | Azam et al. |
| 2009/0324203 A1 | 12/2009 | Wiklof |
| 2010/0020794 A1 | 1/2010 | Cholas et al. |
| 2010/0037282 A1 | 2/2010 | Iwata et al. |
| 2010/0043022 A1 | 2/2010 | Kaftan |
| 2010/0050225 A1 | 2/2010 | Bennett |
| 2010/0086277 A1 | 4/2010 | Craner |
| 2010/0095323 A1 | 4/2010 | Williamson et al. |
| 2010/0100899 A1 | 4/2010 | Bradbury et al. |
| 2010/0115121 A1 | 5/2010 | Roos et al. |
| 2010/0135639 A1 | 6/2010 | Ellis et al. |
| 2010/0146581 A1* | 6/2010 | Erk ............... 725/152 |
| 2010/0158479 A1 | 6/2010 | Craner |
| 2010/0158480 A1 | 6/2010 | Jung et al. |
| 2010/0162285 A1 | 6/2010 | Cohen et al. |
| 2010/0169926 A1 | 7/2010 | Westberg et al. |
| 2010/0195827 A1 | 8/2010 | Lee et al. |
| 2010/0217613 A1 | 8/2010 | Kelly |
| 2010/0235862 A1* | 9/2010 | Adachi ............... 725/44 |
| 2010/0239228 A1 | 9/2010 | Sano |
| 2010/0242079 A1 | 9/2010 | Riedl et al. |
| 2010/0246582 A1 | 9/2010 | Salinger et al. |
| 2010/0247067 A1 | 9/2010 | Gratton |
| 2010/0251304 A1 | 9/2010 | Donoghue et al. |
| 2010/0251305 A1 | 9/2010 | Kimble et al. |
| 2010/0254386 A1 | 10/2010 | Salinger et al. |
| 2010/0265391 A1 | 10/2010 | Muramatsu et al. |
| 2010/0284537 A1 | 11/2010 | Inbar |
| 2010/0293583 A1 | 11/2010 | Loebig et al. |
| 2010/0299528 A1 | 11/2010 | Le Floch |
| 2010/0306401 A1 | 12/2010 | Gilson |
| 2010/0313222 A1 | 12/2010 | Lee et al. |
| 2010/0319037 A1 | 12/2010 | Kim |
| 2010/0329645 A1 | 12/2010 | Sakamoto |
| 2011/0001879 A1 | 1/2011 | Goldey et al. |
| 2011/0007218 A1 | 1/2011 | Moran et al. |
| 2011/0043652 A1 | 2/2011 | King et al. |
| 2011/0078750 A1 | 3/2011 | Tam et al. |
| 2011/0080529 A1 | 4/2011 | Wong |
| 2011/0099364 A1 | 4/2011 | Robyr et al. |
| 2011/0131413 A1 | 6/2011 | Moon et al. |
| 2011/0138169 A1 | 6/2011 | Michel |
| 2011/0138424 A1* | 6/2011 | Vlot ............... H04N 5/4401 725/48 |
| 2011/0145854 A1 | 6/2011 | Bacon et al. |
| 2011/0150429 A1 | 6/2011 | Kaneko |
| 2011/0162011 A1 | 6/2011 | Hassell et al. |
| 2011/0179453 A1 | 7/2011 | Poniatowski |
| 2011/0225616 A1 | 9/2011 | Ellis |
| 2011/0235701 A1 | 9/2011 | Kim |
| 2011/0239249 A1 | 9/2011 | Murison et al. |
| 2011/0255002 A1 | 10/2011 | Witheiler |
| 2011/0286719 A1 | 11/2011 | Woods |
| 2011/0311045 A1 | 12/2011 | Candelore et al. |
| 2012/0183276 A1 | 7/2012 | Quan et al. |
| 2012/0195433 A1* | 8/2012 | Eppolito ............... H04S 3/008 381/1 |
| 2012/0198501 A1 | 8/2012 | Ruan et al. |
| 2012/0236933 A1 | 9/2012 | Saitoh |
| 2012/0278837 A1 | 11/2012 | Curtis et al. |
| 2012/0296745 A1 | 11/2012 | Harper et al. |
| 2012/0301104 A1 | 11/2012 | Dove |
| 2012/0311534 A1 | 12/2012 | Fox et al. |
| 2012/0311634 A1 | 12/2012 | Van Duyn |
| 2012/0331505 A1 | 12/2012 | Chun et al. |
| 2013/0014146 A1 | 1/2013 | Bhatia et al. |
| 2013/0014159 A1 | 1/2013 | Wiser et al. |
| 2013/0051555 A1 | 2/2013 | Martch et al. |
| 2013/0051758 A1 | 2/2013 | Kummer et al. |
| 2013/0051764 A1 | 2/2013 | Casagrande |
| 2013/0051766 A1 | 2/2013 | Martch et al. |
| 2013/0051773 A1 | 2/2013 | Casagrande |
| 2013/0054579 A1 | 2/2013 | Kennedy |
| 2013/0055304 A1 | 2/2013 | Kirby et al. |
| 2013/0055305 A1 | 2/2013 | Martch et al. |
| 2013/0055310 A1 | 2/2013 | VanDuyn et al. |
| 2013/0055311 A1 | 2/2013 | Kirby et al. |
| 2013/0055314 A1 | 2/2013 | Martch |
| 2013/0055333 A1 | 2/2013 | Kummer |
| 2013/0216208 A1 | 8/2013 | Kummer et al. |
| 2013/0223814 A1 | 8/2013 | Casagrande |
| 2013/0243397 A1 | 9/2013 | Minnick et al. |
| 2013/0243398 A1 | 9/2013 | Templeman et al. |
| 2013/0243399 A1 | 9/2013 | Casagrande et al. |
| 2013/0243401 A1 | 9/2013 | Casagrande |
| 2013/0243402 A1 | 9/2013 | Kummer et al. |
| 2013/0243403 A1 | 9/2013 | Martch |
| 2013/0243405 A1 | 9/2013 | Templeman et al. |
| 2013/0243406 A1 | 9/2013 | Kirby |
| 2013/0247089 A1 | 9/2013 | Kummer et al. |
| 2013/0247090 A1 | 9/2013 | Kummer et al. |
| 2013/0247106 A1 | 9/2013 | Martch et al. |
| 2013/0247107 A1 | 9/2013 | Templeman |
| 2013/0247111 A1 | 9/2013 | Templeman et al. |
| 2013/0247115 A1 | 9/2013 | Minnick |
| 2013/0298166 A1 | 11/2013 | Herrington et al. |
| 2013/0347037 A1 | 12/2013 | Soroushian |
| 2014/0047477 A1 | 2/2014 | VanDuyn |

(56) References Cited

U.S. PATENT DOCUMENTS

| | | |
|---|---|---|
| 2014/0050462 A1 | 2/2014 | Kummer et al. |
| 2014/0126889 A1 | 5/2014 | Kummer et al. |
| 2014/0130094 A1 | 5/2014 | Kirby et al. |
| 2014/0147102 A1 | 5/2014 | Shartzer et al. |
| 2014/0201767 A1 | 7/2014 | Seiden et al. |
| 2014/0341377 A1 | 11/2014 | Kummer et al. |
| 2014/0344858 A1 | 11/2014 | Minnick |
| 2014/0363139 A1 | 12/2014 | Kirby |
| 2014/0376884 A1 | 12/2014 | Lovell |
| 2015/0040166 A1 | 2/2015 | Tamura et al. |
| 2015/0104146 A1 | 4/2015 | Higuchi et al. |
| 2015/0121430 A1 | 4/2015 | Templeman |
| 2015/0208119 A1 | 7/2015 | Casagrande et al. |
| 2015/0208125 A1 | 7/2015 | Robinson |
| 2015/0228305 A1 | 8/2015 | Templeman et al. |
| 2015/0245089 A1 | 8/2015 | Potrebic |
| 2015/0245113 A1 | 8/2015 | Casagrande |
| 2015/0319400 A1 | 11/2015 | Golyshko |
| 2016/0073144 A1 | 3/2016 | Robinson |
| 2016/0080800 A1 | 3/2016 | Casagrande |
| 2016/0105711 A1 | 4/2016 | Martch et al. |
| 2016/0134926 A1 | 5/2016 | Casagrande et al. |
| 2016/0198215 A1 | 7/2016 | Hardy |
| 2016/0234543 A1 | 8/2016 | Templeman |

FOREIGN PATENT DOCUMENTS

| | | |
|---|---|---|
| CN | 101202600 A | 6/2008 |
| CN | 101310532 A | 11/2008 |
| CN | 101 404 780 A | 4/2009 |
| CN | 101978690 A | 2/2011 |
| EP | 0 903 743 A | 3/1999 |
| EP | 0 973 333 A | 1/2000 |
| EP | 1 001 631 A1 | 5/2000 |
| EP | 1 168 347 A | 1/2002 |
| EP | 1372339 A2 | 12/2003 |
| EP | 1 447 983 A1 | 8/2004 |
| EP | 1 742 467 A2 | 1/2007 |
| EP | 2 018 059 A1 | 1/2009 |
| EP | 2 317 767 A1 | 5/2011 |
| EP | 2 357 563 A1 | 8/2011 |
| EP | 1 667 452 B1 | 11/2011 |
| EP | 2 403 239 A1 | 1/2012 |
| EP | 2 541 929 A1 | 1/2013 |
| EP | 2 826 197 A1 | 1/2015 |
| EP | 2 826 238 A1 | 1/2015 |
| GB | 2 459 705 A | 11/2009 |
| IN | 9740/CHENP/2013 A | 9/2014 |
| IN | 7408/CHENP/2014 A | 1/2016 |
| IN | 9493/CHEN/2013 A | 6/2016 |
| JP | 2007 116525 A | 5/2007 |
| JP | 2010165058 A | 7/2010 |
| WO | 98/12872 A1 | 3/1998 |
| WO | 01/24532 A1 | 4/2001 |
| WO | 02/41625 A1 | 5/2002 |
| WO | 2004/057610 A1 | 7/2004 |
| WO | 2007/047410 A2 | 4/2007 |
| WO | 2008/010118 A1 | 1/2008 |
| WO | 2008/010689 A1 | 1/2008 |
| WO | 2008/060486 A2 | 5/2008 |
| WO | 2011/027236 A1 | 3/2011 |
| WO | 2011/081729 A1 | 7/2011 |
| WO | 2012/003693 A1 | 1/2012 |
| WO | 2013/028824 A3 | 2/2013 |
| WO | 2013/028829 A2 | 2/2013 |
| WO | 2013/028835 A1 | 2/2013 |
| WO | 2013/138606 A1 | 9/2013 |
| WO | 2013/138608 A1 | 9/2013 |
| WO | 2013/138610 A1 | 9/2013 |
| WO | 2013/138638 A1 | 9/2013 |
| WO | 2013/138689 A1 | 9/2013 |
| WO | 2013/138740 A1 | 9/2013 |
| WO | 2016/066443 A1 | 5/2016 |
| WO | 2016/111817 A1 | 7/2016 |

OTHER PUBLICATIONS

International Preliminary Report on Patentability for PCT/US2013/031432 issued Sep. 16, 2014, 9 pages.
International Search Report and Written Opinion of PCT/US2013/031445 mailed May 24, 2013, 11 pages.
International Preliminary Report on Patentability for PCT/US2013/031445 issued Sep. 16, 2014, 10 pages.
U.S. Appl. No. 13/302,852, filed Nov. 22, 2011, Non-Final Rejection mailed Sep. 2, 2014, 28 pages.
U.S. Appl. No. 13/793,636, filed Mar. 11, 2013, Non-Final Office Action mailed Sep. 29, 2014, 27 pages.
U.S. Appl. No. 13/800,477, filed Mar. 13, 2013 Non-Final Office Action mailed Sep. 11, 2014, 34 pages.
International Preliminary Report on Patentability for PCT/US2013/032176 mailed Sep. 25, 2014, 7 pages.
International Preliminary Report on Patentability for PCT/US2013/031565 issued Sep. 16, 2014, 18 pages.
International Preliminary Report on Patentability for PCT/US2013/031915 issued Sep. 16, 2014, 5 pages.
International Search Report and Written Opinion of PCT/US2013/031440 mailed May 30, 2013, 14 pages.
International Preliminary Report on Patentability for PCT/US2013/031440 mailed Sep. 25, 2014, 8 pages.
Author Unknown, "EE Launches home TV service in UK," dated Oct. 8, 2014, 3 pages. Retrieved on Oct. 13, 2014 from http://www.bbc.com/news/technology-29535279.
Author Unknown, "EE TV Its simply great television," Accessed on Oct. 13, 2014, 11 pages. Retrieved from https//ee.co.uk/ee-and-me/ee-tv.
McCann, John, "EE TV set top takes aim at Sky, Virgin Media and YouView," dated Oct. 8, 2014, 5 pages. Retrieved on Oct. 13, 2014 from http://www.techradar.com/news/television/ee-tv-set-top-box-takes-aim-at-sky-virgin-media-and-youview-1268223.
Williams, Christopher, "EE to launch TV set-top box," dated Oct. 7, 2014, 2 pages. Retrieved on Oct. 13, 2014 from http://www.telegraph.co.uk/finance/newsbysector/mediatechnologyandtelecoms/telecoms/11147319/EE-to-launch-TV-set-top-box.html.
International Search Report and Written Opinion of PCT/US2012/51992 mailed Nov. 2, 2012, 15 pages.
International Search Report and Written Opinion of PCT/US2012/51987 mailed Oct. 23, 2012, 20 pages.
International Search Report and Written Opinion of PCT/US2012/051984 mailed Nov. 5, 2012, 13 pages.
International Search Report and Written Opinion of PCT/US2012/52002 mailed Oct. 16, 2012, 17 pages.
International Search Report and Written Opinion of PCT/US2012/51964 mailed Nov. 2, 2012, 13 pages.
International Search Report and Written Opinion of PCT/US2012/052011 mailed Dec. 17, 2012, 44 pages.
Author Unknown, "Move Networks is Delivering the Next Generation of Television," Move Networks, 2010, obtained online at http://movenetworks.com/, 2 pages.
Jung, J., et al., "Design and Implementation of a Multi-Stream CableCARD with a High-Speed DVB-Common Descrambler," ACM Multimedia, 2006, 4 pages.
U.S. Appl. No. 13/149,852, filed May 31, 2011 Non-Final Office Action mailed Dec. 12 2012, 9 pages.
U.S. Appl. No. 13/149,852, filed May 31, 2011 Final Office Action mailed Mar. 26, 2013, 13 pages.
U.S. Appl. No. 13/149,852, filed May 31, 2011 Notice of Allowance mailed Jul. 11, 2013, 13 pages.
U.S. Appl. No. 13/286,157, filed Oct. 31, 2011, Non-Final Office Action mailed Jan. 17, 2013, 20 pages.
U.S. Appl. No. 13/286,157, filed Oct 31, 2011 Non-Final Office Action mailed Jul. 25, 2013, 49 pages.
U.S. Appl. No. 13/286,157, filed Oct. 31, 2011 Notice of Allowance mailed Feb. 3, 2014, 81 pages.
U.S. Appl. No. 13/215,702, filed Aug. 23, 2011 Notice of Allowance mailed Feb. 11, 2013, 13 pages.
U.S. Appl. No. 13/288,002, filed Nov. 2, 2011 Non-final Office Action mailed Sep. 26, 2013, 15 pages.

(56) References Cited

OTHER PUBLICATIONS

U.S. Appl. No. 13/302,852, filed Nov. 22, 2011 Non-Final Rejection mailed May 23, 2013, 19 pages.
U.S. Appl. No. 13/302,852, filed Nov. 22, 2011 Final Rejection mailed Dec. 9, 2013, 23 pages.
U.S. Appl. No. 13/324,831, filed Dec. 13, 2011 Non-Final Office Action mailed Feb. 28, 2013, 23 pages.
U.S. Appl. No. 13/324,831, filed Dec. 13, 2011 Notice of Allowance mailed Sep. 4, 2013, 22 pages.
U.S. Appl. No. 13/292,047, filed Nov. 8, 2011 Non-Final Office Action mailed Jan. 18, 2013, 17 pages.
U.S. Appl. No. 13/292,047, filed Nov. 8, 2011 Final Office Action mailed Aug. 19, 2013, 17 pages.
U.S. Appl. No. 13/614,899, filed Sep. 13, 2012 Non-Final Office Action mailed Feb. 5, 2013, 17 pages.
U.S. Appl. No. 13/614,899, filed Sep. 13, 2012 Non-Final Office Action mailed Sep. 17, 2013, 17 pages.
U.S. Appl. No. 13/291,014, filed Nov. 7, 2011 Non-Final Office Action mailed Mar. 29, 2013, 21 pages.
U.S. Appl. No. 13/291,014, filed Nov. 7, 2011 Notice of Allowance mailed Aug. 7, 2013, 16 pages.
U.S. Appl. No. 13/215,598, filed Aug. 23, 2011 Non-Final Office Action mailed Jun. 20, 2013, 15 pages.
U.S. Appl. No. 13/215,598, filed Aug. 23, 2011 Final Office Action mailed Nov. 21, 2013, 23 pages.
U.S. Appl. No. 13/215,598, filed Aug. 23, 2011 Non-Final Office Action mailed Feb. 6, 2014, 12 pages.
U.S. Appl. No. 13/215,655, filed Aug. 23, 2011 Non-Final Office Action mailed Sep. 6, 2013, 27 pages.
U.S. Appl. No. 13/215,655, filed Aug. 23, 2011 Final Office Action mailed Dec. 18, 2013, 20 pages.
U.S. Appl. No. 13/215,916, filed Aug. 23, 2011 Notice of Allowance mailed Jan. 4, 2013, 10 pages.
U.S. Appl. No. 13/294,005, filed Nov. 11, 2011 Non-Final Office Action mailed Aug. 14, 2013, 32 pages.
U.S. Appl. No. 13/294,005, filed Nov. 11, 2011 Final Office Action mailed Jan. 3, 2014, 29 pages.
U.S. Appl. No. 13/592,976, filed Aug. 23, 2012 Notice of Allowance mailed Oct. 7, 2013, 18 pages.
U.S. Appl. No. 13/829,350, filed Mar. 14, 2013, Non Final Office Action mailed Feb. 28, 2014, 29 pages.
U.S. Appl. No. 13/799,719, filed Mar. 13, 2013, Non Final Office Action mailed Oct. 25, 2013, 79 pages.
U.S. Appl. No. 14/064,423, filed Oct. 28, 2013, Non-Final Office Action mailed Dec. 20, 2013, 18 pages.
U.S. Appl. No. 14/064,423, filed Oct. 28, 2013, Notice of Allowance mailed Mar. 4, 2013, 37 pages.
International Search Report of PCT/KR2007/003521 mailed on Oct. 23, 2007, 22 pages.
International Search Report of PCT/IB2003/005737 mailed on Mar. 3, 2004, 21 pages.
Jensen, Craig, "Fragmentation: the condition, the cause, the cure" 'Online!, Executive Software International, 1994; ISBN: 0964004909; retrieved from Internet: <URL: www.executive.com/fragbook/fragbook.htm> Chapter: "How a disk works", Section: "The original problem". Retrieved on Jan. 9, 2014.
U.S. Appl. No. 13/795,914, filed Mar. 6, 2013, Non-Final Office Action mailed Oct. 11, 2013, 17 pages.
International Search Report and Written Opinion of PCT/US2013/32176 mailed on Jun. 25, 2013, 15 pages.
International Search Report and Written Opinion of PCT/US2013/031565 mailed on May 31, 2013, 82 pages.
International Search Report and Written Opinion of PCT/US2013/031915 mailed on Jun. 3, 2013, 7 pages.
International Preliminary Report on Patentability for PCT/US2012/052002 mailed on Apr. 17, 2014, 10 pages.
International Preliminary Report on Patentability, PCT/US2012/052011, mailed on Mar. 6, 2014, 6 pages.
International Preliminary Report on Patentability, PCT/US2012/051984, mailed on Mar. 6, 2014, 8 pages.
International Preliminary Report on Patentability, PCT/US2012/051964, mailed on Apr. 10, 2014, 7 pages.
International Preliminary Report on Patentability, PCT/US2012/051992, mailed on Apr. 3, 2014, 7 pages.
International Preliminary Report on Patentability, PCT/US2012/051987, mailed on Mar. 6, 2014, 7 pages.
U.S. Appl. No. 13/288,002, filed Nov. 2, 2011, Final Office Action mailed Mar. 27, 2014, 20 pages.
U.S. Appl. No. 13/614,899, filed Sep. 13, 2012, Final Office Action mailed Mar. 17, 2014, 41 pages.
U.S. Appl. No. 13/797,173, filed Mar. 12, 2013, Non Final Office Action mailed May 15, 2014, 28 pages.
U.S. Appl. No. 13/799,653, filed Mar. 13, 2013, Non Final Office Action mailed May 8, 2014, 24 pages.
U.S. Appl. No. 13/828,001, filed Mar. 14, 2013, Notice of Allowance mailed Apr. 25, 2014, 43 pages.
U.S. Appl. No. 13/799,719, filed Mar. 13, 2013, Notice of Allowance mailed Apr. 23, 2014, 141 pages.
U.S. Appl. No. 13/757,168, filed Feb. 1, 2013 Non Final Office Action mailed Jun. 4, 2014, 23 pages.
U.S. Appl. No. 13/799,604, filed Mar. 13, 2013 Non Final Office Action mailed Jun. 6, 2014, 24 pages.
U.S. Appl. No. 13/614,899, filed Sep. 13, 2012 Non-Final Office Action mailed May 20, 2014, 25 pages.
U.S. Appl. No. 13/215,598, filed Aug. 23, 2011 Final Office Action mailed Jul. 2, 2014, 22 pages.
U.S. Appl. No. 13/294,005, filed Nov. 11, 2011 Non-Final Office Action mailed May 20, 2014, 33 pages.
U.S. Appl. No. 13/829,350, filed Mar. 14, 2013 Non Final Office Action mailed Jul. 29, 2014, 24 pages.
U.S. Appl. No. 13/795,914, filed Mar. 6, 2013 Notice of Allowance mailed Jul. 21, 2014, 13 pages.
U.S. Appl. No. 13/795,914, filed Mar. 6, 2013 Final Office Action mailed Apr. 3, 2014, 17 pages.
U.S. Appl. No. 14/095,860, filed Dec. 3, 2013 Final Office Action mailed May 1, 2015, 18 pages.
U.S. Appl. No. 14/060,388, filed Oct. 22, 2013 Notice of Allowance mailed Apr. 13, 2015, 44 pages.
U.S. Appl. No. 13/888,012, filed May 6, 2013 Non-Final Rejection mailed Apr. 6, 2015, 36 pages.
U.S. Appl. No. 13/801,968, filed Mar. 13, 2013 Non Final Office Action mailed May 21, 2015, 49 pages.
U.S. Appl. No. 13/614,899, filed Sep. 13, 2012 Notice of Allowance mailed Mar. 13, 2015, 35 pages.
U.S. Appl. No. 13/302,852, filed Nov. 22, 2011 Final Rejection mailed Mar. 30, 2015, 29 pages.
U.S. Appl. No. 13/215,598, filed Aug. 23, 2011 Final Office Action mailed May 5, 2015, 17 pages.
European Search Report for EP 12825653 dated Mar. 11, 2015, 7 pages.
Supplementary European Search Report for Application No. EP 12825147 dated Mar. 27, 2015, 9 pages.
The Notice of Allowance by the Mexican Institute of Industrial Property for Mexican Patent Application No. MX/a/2013/014907 dated Feb. 20, 2015 is not translated into English, 1 page.
The Notice of Allowance by the Mexican Institute of Industrial Property for Mexican Patent Application No. MX/a/2013/014677 dated Mar. 19, 2015 is not translated into English, 1 page.
The second Office Action dated Feb. 26, 2015 for Mexican Pat. Appln. No. MX/a/2013/014217 is not translated into English, 3 pages.
U.S. Appl. No. 13/856,752, filed Apr. 4, 2013 Notice of Allowance mailed Feb. 10, 2015, 20 pages.
U.S. Appl. No. 13/799,604, filed Mar. 13, 2013, Final Office Action mailed Jan. 14, 2015, 36 pages.
U.S. Appl. No. 13/797,173, filed Mar. 12, 2013 Notice of Allowance mailed Feb. 26, 2015, 19 pages.
U.S. Appl. No. 13/793,636, filed Mar. 11, 2013, Notice of Allowance mailed Jan. 28, 2015, 43 pages.
U.S. Appl. No. 13/800,477, filed Mar. 13, 2013 Notice of Allowance mailed Feb. 18, 2015, 18 pages.
Extended European Search Report for EP 12825474 mailed Jan. 7, 2015, 6 pages.

(56) References Cited

OTHER PUBLICATIONS

Extended European Search Report for EP 12825430 mailed Feb. 3, 2015, all pages.
The Office Action dated Nov. 7, 2014 for Mexican Patent Application No. MX/a/2013/014907 is not translated into English, 3 pages.
The Office Action dated Jan. 23, 2015 for Mexican Patent Application No. MX/a/2013/014671 is not translated into English, 3 pages.
Extended European Search Report for EP 12825080 mailed Sep. 11, 2014, 10 pages.
Extended European Search Report for EP 12825521 mailed Nov. 24, 2014, 7 pages.
The Office Action dated Nov. 6, 2014 for Mexican Patent Application No. MX/a/2013/014677 is not translated into English. This document is from prosecution of the corresponding foreign matter for which we do not have a translation, 2 pages.
U.S. Appl. No. 14/095,860, filed Dec. 3, 2013 Non-Final Office Action mailed Dec. 26, 2014, 45 pages.
U.S. Appl. No. 13/856,752, filed Apr. 4, 2013, Non Final Office Action mailed Nov. 5, 2014, 34 pages.
U.S. Appl. No. 13/829,350, filed Mar. 14, 2013 Final Office Action mailed Jan. 23, 2015, 18 pages.
U.S. Appl. No. 13/799,653, filed Mar. 13, 2013, Notice of Allowance mailed Nov. 26, 2014, 32 pages.
U.S. Appl. No. 13/797,173, filed Mar. 12, 2013, Notice of Allowance mailed Nov. 24, 2014, 37 pages.
U.S. Appl. No. 13/757,168, filed Feb. 1, 2013, Notice of Allowance mailed Oct. 14, 2014, 28 pages.
U.S. Appl. No. 13/294,005, filed Nov. 11, 2011, Notice of Allowance mailed Oct. 31, 2014, 24 pages.
U.S. Appl. No. 13/292,047, filed Nov. 8, 2011, Final Office Action mailed Jan. 13, 2015, 22 pages.
U.S. Appl. No. 13/215,598, filed Aug. 23, 2011, Non-Final Office Action mailed Nov. 25, 2014, 18 pages.
U.S. Appl. No. 13/292,047, filed Nov. 8, 2011 Non-Final Office Action mailed Jul. 7, 2015, 28 pages.
U.S. Appl. No. 13/302,852, filed Nov. 22, 2011 Notice of Allowance mailed Jun. 19, 2015, 26 pages.
U.S. Appl. No. 13/799,604, filed Mar. 13, 2013 Notice of Allowance mailed May 29, 2015, 46 pages.
U.S. Appl. No. 13/888,012, filed May 6, 2013 Notice of Allowance mailed Jul. 14, 2015, 18 pages.
U.S. Appl. No. 14/095,860, filed Dec. 3, 2013 Notice of Allowance mailed Jul. 13, 2015, 31 pages.
U.S. Appl. No. 14/154,887, filed Jan. 14, 2014 Non-Final Rejection mailed Jul. 17, 2015, 33 pages.
U.S. Appl. No. 14/467,959, filed Aug. 25, 2014 Notice of Allowance mailed Jun. 22, 2015, 36 pages.
U.S. Appl. No. 13/288,002, filed Nov. 2, 2011 Non Final Rejection mailed Jul. 28, 2015, 29 pages.
U.S. Appl. No. 13/829,350, filed Mar. 14, 2013 Notice of Allowance mailed Jul. 24, 2015, 29 pages.
Extended European Search Report for EP 13760237.1 received Jul. 21, 2015, 8 pages.
First Office Action and Search Report from the State Intellectual Property Office (SIPO) for CN 201280031434.7, issued Jul. 17, 2015, 12 pages.
Office Action dated Jul. 31, 2015 for Mexican Patent Application No. MX/a/2014/009928, 2 pages.
U.S. Appl. No. 14/340,190, filed Jul. 24, 2014, Non-Final Rejection mailed Aug. 31, 2015, 74 pages.
U.S. Appl. No. 13/799,604, filed Mar. 13, 2013, Notice of Allowance mailed Jul. 24, 2015, 34 pages.
Supplementary European Search Report for EP 13761291.7 mailed Jul. 9, 2015, 8 pages.
Office Action dated May 18, 2015 for Mexican Patent Application No. MX/a/2014/009776, 2 pages.
Office Action dated May 12, 2015 for Mexican Patent Application No. MX/a/2014/009723, 2 pages.
U.S. Appl. No. 14/340,190, filed Jul. 24, 2014, Final Rejection mailed Feb. 19, 2016, 54 pages.
U.S. Appl. No. 14/154,887, filed Jan. 14, 2014 Notice of Allowance mailed Jan. 21, 2016, 26 pages.
U.S. Appl. No. 13/288,002, filed Nov. 2, 2011 Final Rejection mailed Jan. 13, 2016, 22 pages.
U.S. Appl. No. 13/292,047, filed Nov. 8, 2011 Notice of Allowance mailed Jan. 29, 2016, 45 pages.
U.S. Appl. No. 13/215,598, filed Aug. 23, 2011 Non Final Office Action mailed Dec. 15, 2015, all pages.
U.S. Appl. No. 13/801,968, filed Mar. 13, 2013 Final Office Action mailed Nov. 19, 2015, all pages.
U.S. Appl. No. 14/589,090, Notice of Allowance mailed Feb. 9, 2016, 47 pages.
U.S. Appl. No. 14/591,549, Non Final Office Action mailed Dec. 31, 2015, 19 pages.
U.S. Appl. No. 14/338,114, filed Jul. 22, 2014 Notice of Allowance mailed Feb. 3, 2016, all pages.
Second Office Action for CN 201280031434.7, issued Dec. 23, 2015, 6 pages.
First Office Action issued by State Intellectual Property Office (SIPO) for CN 201280028697.2, issued Dec. 16, 2015, 11 pages.
Notice of Allowance received for Mexican Patent Appln. MX/a/2013/014991, mailed on Dec. 9, 2015, 1 page.
Notice of Allowance mailed Dec. 4, 2015 for Mexican Patent Application No. MX/a/2014/009723, 1 page.
U.S. Appl. No. 13/786,915, filed Mar. 6, 2013 Non Final Rejection mailed Oct. 15, 2015, 59 pages.
U.S. Appl. No. 13/801,994 Non Final Office Action mailed Oct. 7, 2015, 55 pages.
U.S. Appl. No. 14/095,860, filed Dec. 3, 2013 Notice of Allowance mailed Oct. 19, 2015, 14 pages.
U.S. Appl. No. 14/338,114, filed Jul. 22, 2014 Non-Final Office Action mailed Sep. 30, 2015, all pages.
U.S. Appl. No. 14/529,989, filed Oct. 31, 2014 Non-Final Office Action mailed Nov. 4, 2015, all pages.
U.S. Appl. No. 14/043,617, filed Oct. 1, 2013 Non-Final Office Action mailed Oct. 23, 2015, all pages.
U.S. Appl. No. 14/676,137, filed Apr. 1, 2015 Notice of Allowance mailed Sep. 28, 2015, 35 pages.
Supplementary European Search Report for EP 13760902 mailed Oct. 20, 2015, all pages.
Supplementary European Search Report for EP 13761427 mailed Oct. 19, 2015, all pages.
The Notice of Allowance by the Mexican Institute of Industrial Property for Mexican Patent Application No. MX/a/2013/014671 dated Apr. 17, 2015, 1 page.
Office Action dated Jul. 31, 2015 for Mexican Patent Application No. MX/a/2014/009919, 2 pages.
International Search Report and Written Opinion of PCT/US2015/065934 mailed Apr. 8, 2016, all pages.
International Search Report and Written Opinion of PCT/EP2015/073937 mailed Apr. 15, 2016, all pages.
Office Action for EP 13 192 169.4 dated Mar. 29, 2016, all pages.
U.S. Appl. No. 13/786,915, filed Mar. 6, 2013, Final Rejection mailed May 12, 2016, 27 pages.
U.S. Appl. No. 13/786,915, filed Mar. 6, 2013, Notice of Allowance mailed Jul. 19, 2016, all pages.
U.S. Appl. No. 14/757,606, filed Dec. 23, 2015, Non Final Rejection mailed Mar. 24, 2016, 33 pages.
U.S. Appl. No. 14/757,606, filed Dec. 23, 2015, Notice of Allowance mailed Jul. 18, 2016, all pages.
U.S. Appl. No. 14/340,190, filed Jul. 24, 2014, Notice of Allowance mailed Aug. 22, 2016, all pages.
U.S. Appl. No. 13/215,598, filed Aug. 23, 2011 Notice of Allowance mailed May 24, 2016, all pages.
U.S. Appl. No. 13/801,968, filed Mar. 13, 2013 Notice of Allowance mailed Apr. 7, 2016, 33 pages.
U.S. Appl. No. 13/801,994, Final Office Action mailed May 4, 2016, 37 pages.
U.S. Appl. No. 14/591,549, Final Office Action mailed Jun. 30, 2016, all pages.

(56) References Cited

OTHER PUBLICATIONS

U.S. Appl. No. 14/529,989, filed Oct. 31, 2014, Final Rejection mailed May 6, 2016, 27 pages.
Office Action for European Application No. 12825147 dated Mar. 7, 2016, all pages.
First Office Action and Search Report from the State Intellectual Property Office (SIPO) for CN 201280031150.8, issued Aug. 3, 2016, 10 pages.
Decision to Grant from the State Intellectual Property Office (SIPO) for CN 201280031434.7, issued May 12, 2016, all pages.
Notice of Allowance dated Jan. 15, 2016 for Mexican Patent Application No. MX/a/2014/009928, 1 page.
Notice of Allowance dated Jun. 3, 2016 for Mexican Patent Application No. MX/a/2015/009985, 1 page.
Notice of Allowance dated Jun. 6, 2016 for Mexican Patent Application No. MX/a/2015/015383, 1 page.
Notice of Allowance dated Dec. 16, 2015 for Mexican Patent Application No. MX/a/2014/009919, 1 page.
Author Unknown, "Digital Video Broadcasting (DVB); Specification for Service Information (SI) in DVB systems," ETSI EN 300 468 V1.1 (Jan. 2013), 172 pages.
Author Unknown, Digital Video Broadcasting (DVB); Content Protection and Copy Management (DVB-CPCM); Part 3: CPCM Usage State Information; European Broadcasting Union Union Europa de Radio-Television, ETSI TS 102 825-3 V1.1.1 (Jul. 2008), XP014042034, 28 pages.
Hee-Yong Kim et al., "DCT Domain Filter for ATV Down Conversion", Consumer Electronics, 1997. Digest of Technical Papers. ICCE., International Conference on, IEEE, Jun. 11, 1997, pp. 142-143, XP032381904, DOI: 10.1109/ICCE. 1997.625904, ISBN: 978-0/7803-3734-3.

* cited by examiner

SATELLITE-BASED CONTENT TARGETING

BACKGROUND

Advertisements tend to be most effective when targeted to a specific audience. Since targeted advertisements tend to be more effective, advertisers may be willing to pay more for properly targetted advertisements. Television, however, can be a difficult medium in which to target advertisements. Typically, regardless of who is tuned to a paticular television channel, the same content, including the same advertisements, are presented. Television viewers, television service providers, and advertisers may benefit from having television advertisements that are more effectively targeted.

SUMMARY

In some embodiments, a system for managing content distribution is presented. The system may include a television service provider system. The television service provider system may transmit a multiregional television channel to a plurality of television receivers, wherein the multiregional television channel comprises a first set of content. The television service provider system may transmit a plurality of regional television channels. Each regional television channel of the plurality of regional television channels may include a second set of content. Each regional television channel of the plurality of regional television channels may be broadcast to geographically smaller regions than the multiregional television channel. The second set of content among the plurality of regional television channels may vary. The television service provider system may transmit data to cause the plurality of television receivers to output for presentation as a single television channel: the first set of content of the multiregional television channel, and at least some of the second set of content corresponding to a regional television channel of the plurality of regional television channels.

Embodiments of such a system may include one or more of the following features: The system may include a comparison computer system. The comparison computer system may receive a plurality of related television channels and may compare the plurality of related television channels to determine the first set of content of the plurality of related television channels match. The first set of content may include television programming and the second set of content comprises locally-targeted television commercials. The plurality of related television channels may be regional affiliates of a national television network. The system may include a television receiver, configured to alternatively output for presentation the multiregional television channel and the regional television channel of the plurality of regional television channels to appear as the single television channel. The television receiver may be configured to: receive the data; store the second set of content of the regional television channel of the plurality of regional television channels; output for presentation the first set of content while tuned to the multiregional television channel; and/or based on the received data, output for presentation the stored second set of content while continuing to decode the multiregional television channel. The television service provider system may be further configured to transmit the multiregional television channel and the regional television channel to the plurality of television receivers via different transponders.

In some embodiments, a method is presented. The method may include transmitting a multiregional television channel to a plurality of television receivers, wherein the multiregional television channel comprises a first set of content. The method may include transmitting a plurality of regional television channels, wherein each regional television channel of the plurality of regional television channels comprises a second set of content. Each regional television channel of the plurality of regional television channels may be broadcast to geographically smaller regions than the multiregional television channel. The second set of content among the plurality of regional television channels may vary. The method may include transmitting data to cause the plurality of television receivers to output for presentation as a single television channel: the first set of content of the multiregional television channel, and at least some of the second set of content corresponding to a regional television channel of the plurality of regional television channels.

Embodiments of such a method may include one or more of the following: The method may include receiving a plurality of related television channels. The method may include comparing the plurality of related television channels to determine the first set of content of the plurality of related television channels match. The first set of content may include television programming and the second set of content comprises locally-targeted television commercials. The plurality of related television channels may be regional affiliates of a national television network. The method may also include alternatively outputting, by a television receiver, for presentation the multiregional television channel and the regional television channel of the plurality of regional television channels to appear as the single television channel. The method may include: receiving the data; storing the second set of content of the regional television channel of the plurality of regional television channels; outputting for presentation the first set of content while tuned to the multiregional television channel; and/or based on the received data, outputting for presentation the stored second set of content while continuing to decode the multiregional television channel. The method may include transmitting the multiregional television channel and the regional television channel to the plurality of television receivers via different transponders.

In some embodiments, a system for managing content distribution is presented. The system may include means for transmitting a multiregional television channel to a plurality of television receivers, wherein the multiregional television channel comprises a first set of content. The system may include means for transmitting a plurality of regional television channels. Each regional television channel of the plurality of regional television channels may include a second set of content. Each regional television channel of the plurality of regional television channels may be broadcast to geographically smaller regions than the multiregional television channel. The second set of content among the plurality of regional television channels may vary. The system may include means for transmitting data to cause the plurality of television receivers to output for presentation as a single television channel: the first set of content of the multiregional television channel, and at least some of the second set of content corresponding to a regional television channel of the plurality of regional television channels.

Embodiments of such a system may include one or more of the following: The system may include means for receiving a plurality of related television channels; and/or means for comparing the plurality of related television channels to determine the first set of content of the plurality of related television channels match. The first set of content may include television programming and the second set of content may include locally-targeted television commercials. The plurality of related television channels may be regional affiliates of a national television network. The system may include means for alternatively outputting for presentation the multiregional television channel and the regional television channel of the plurality of regional television channels to appear as the single television channel. The system may include: means for receiving the data; means for storing the second set of content of the regional television channel of the plurality of regional television channels; means for outputting for presentation the first set of content while tuned to the multiregional television channel; and/or means for outputting for presentation the stored second set of content while continuing to decode the multiregional television channel.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
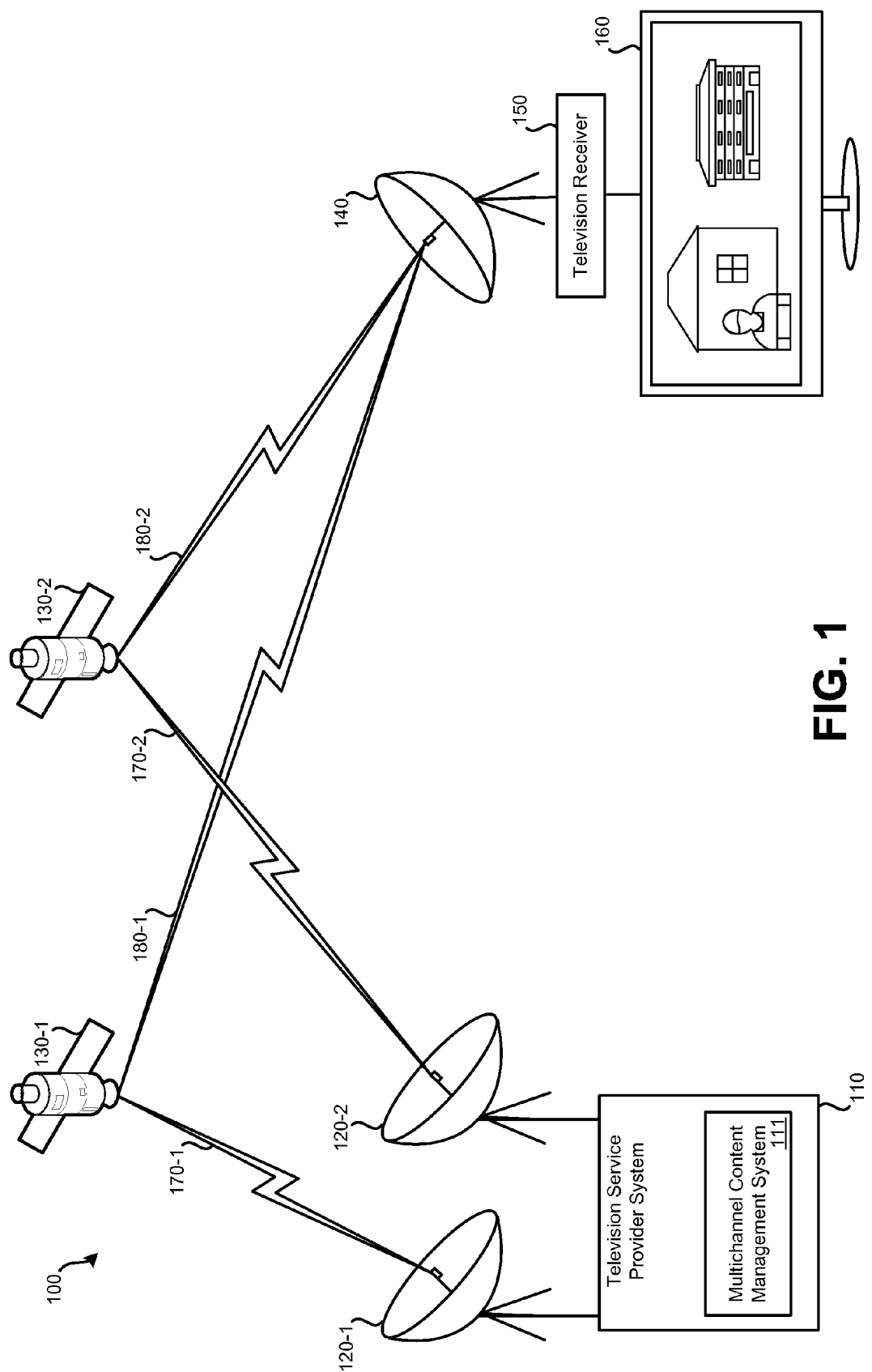
FIG. 1 illustrates an embodiment of a satellite-based television distribution system configured to deliver targeted content via satellite to user equipment.

For satellite-based television distribution systems, difficulties exist in targeting content, including television programming and advertisements, to specific audiences. For some forms of television distribution programming, such as cable television distribution networks, it may be possible to distribute a television channel on a national or regional level such that the same television programming is received by television receivers in multiple television markets. Within these television markets, at least some of the advertisements may be targeted to a specific market. For instance, a television commercial for a car dealership may only be broadcast via the cable network in the television market near the car dealership, while the same advertisement slot may be occupied by a commercial for a different local entity in another television market of the cable network.

Targeting such content (e.g., television commercials/advertisements) for different television markets may be more challenging for a satellite-based television service provider. A satellite-based television service provider may transmit, via satellite, a single signal that is received nationwide or in multiple television markets (e.g., the east coast of the United States) for a particular television channel. Therefore, the same content, including the same television commercials, may be broadcast in multiple television markets due to a single satellite-distributed signal being used for the television channel in multiple television markets. While it may be possible to use multiple television channels to broadcast a regionalized version of the television channel (e.g., broadcast the same content with at least some different television commercials), such an arrangement may require a significant amount of satellite bandwidth.

In some embodiments detailed herein, a first television channel may be broadcast as part of a first transponder stream, while commercials to be shown on the first television channel are broadcast on a second television channel, which may be part of a second transponder stream, transmitted by a same or different satellite. A television receiver, such as a set top box (STB), may use two tuners and two decoders to receive each of these television channels. In some embodiments, when a television commercial break is to occur, the television receiver may switch to outputting the second television channel for presentation (possibly unbeknownst to the user of the television receiver). The second television channel may be selected, based on the location of the television receiver (e.g., the television market of the television receiver) and/or attributes of the subscriber. Such arrangements may not require that the television receiver store commercials using a non-transitory computer-readable storage medium. After the commercial break, the television receiver may resume outputting for presentation the first television channel. The user of the television receiver may not be made aware that the television receiver switched to outputting content from the second television channel during the commercial break. Based on attributes of the subscriber and/or the location of the television receiver, the second television channel tuned to by the television receiver may vary.

In some embodiments, while the television receiver is using a first tuner to output for presentation a first television channel, a second tuner may be used to tune to the second television channel to receive and store television commercials for presentation during commercial breaks on the television channel. Such arrangements may require the television receiver to have a non-transitory computer-readable storage medium, such as a hard drive, having sufficient available space to store television commercials. The television commercials that are stored may be based on the location of the television receiver and/or attributes of the subscriber.

In some embodiments, a multiregional broadcast of a television network that is distributed nationally may be used to free satellite bandwidth for other uses. Some television networks, such as ABC, NBC, CBS, and FOX, have regional affiliates. At least during certain times of the day, the television programming broadcast matches on multiple regional affiliates. For instance, a same television program may be broadcast at a same time on CBS in Boston and on CBS in New York. While the same television program may be broadcast on the television channel in the two different television markets, at least some of the television commercials broadcast during programming breaks may vary by regional affiliate.

Typically, for a satellite-based television service provider to handle this situation, the two regional affiliates may be treated as separate television channels; therefore, each television channel may be carried individually via one or more transponders of one or more satellites. Rather than having each television channel known to be a regional affiliate treated as a completely separate television channel, a comparison may be made by a television service provider to determine when regional affiliates of a national network are broadcasting the same content. When the same content is being broadcast on multiple regional affiliates, a television receiver may be instructed to tune a first tuner to a multi-regional television channel carrying the same content. For commercial breaks, a second tuner may tune to a regional television channel dedicated to the television market of the television receiver. Via the regional television channel, television commercials may be received and stored by the television receiver for presentation during such commercial breaks, or the television receiver may output the second television channel received by the second tuner live during the commercial breaks. Therefore, despite a multiregional signal being used for the television program, commercials can be at least partially based on content received via a regional signal via a second television tuner. The additional bandwidth of the regional signal may be used to distribute other data to television receivers or other satellite receivers. In such arrangements, a user would still view commercials that are specific to the subscriber's television market, but the satellite-based television service provider would have freed a significant amount of bandwidth that can be used for broadcasting other data to television receivers or other types of satellite receivers. To be clear, a subscriber refers to a person associated with a subscription with a television service provider, while a user can refer to any person interacting with a television receiver (e.g., watching television).

FIG. 1 illustrates an embodiment of a satellite television distribution system 100 configured to deliver targeted content via satellite to user equipment. Satellite television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions) instances and types of user equipment may receive data and television signals from television service provider system 110 via satellites 130.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from downlink signals 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

Figure 2:
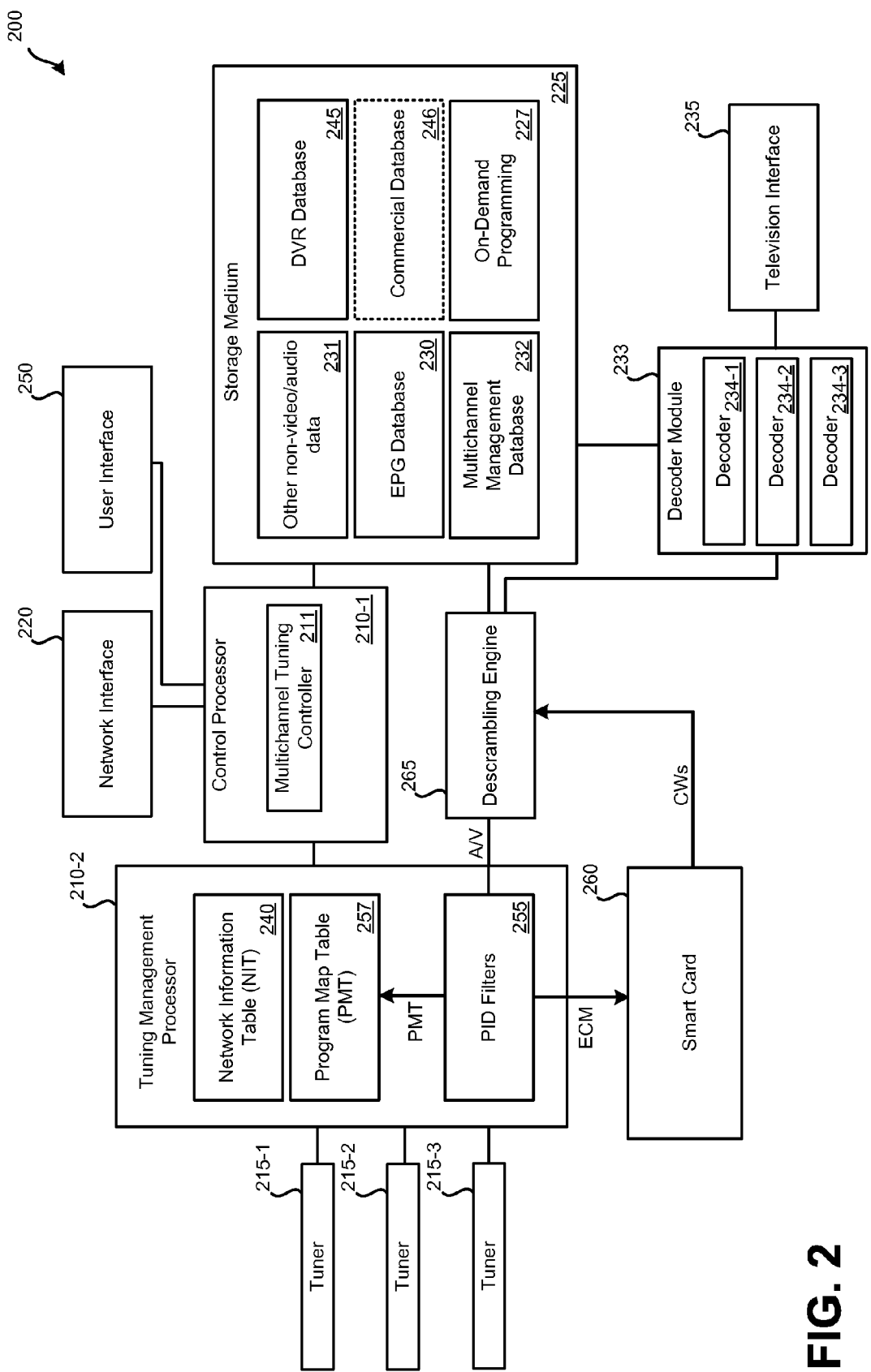
FIG. 2 illustrates an embodiment of a television receiver configured to receive, process, and output for presentation targeted content.

In communication with satellite dish 140 may be one or more television receivers. Television receivers may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. FIG. 2 provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a first group of television channels, while uplink signal 170-2 contains a second group of television channels. Each of these television channels may be scrambled such that unauthorized persons are prevented from accessing the television channels.

Downlink signal 180-1 represents a signal between satellite 130-1 and satellite dish 140. Downlink signal 180-2 represents a signal between satellite 130-2 and satellite dish 140. Each of downlink signals 180 may contain one or more different television channels, which may be at least partially scrambled. A downlink signal may be in the form of a transponder stream. A single transponder stream may be tuned to at a given time by a tuner of a television receiver For example, downlink signal 180-1 may be a first transponder stream containing a first group of television channels, while downlink signal 180-2 may be a second transponder stream containing a different group of television channels.

Some or all of satellites 130 may be configured to transmit spot beams. A spot beam may allow a satellite to transmit a transponder stream to a particular geographic region (e.g., to distribute local television channels to the relevant television market). A spot beam is directed to a smaller geographic region than a non-spot beam. For instance, a first transponder that is a spot beam may be directed to provide a transponder stream to the greater-Boston area, while a non-spot beam may be directed to provide another transponder stream to the contiguous forty-eight states. An advantage of a spot beam is that the same frequency may be reused in a different geographic area. For instance, a spot beam at a first frequency directed to the east coast of the United States may be reused to carry different television channels at the same frequency to the west coast. A multiregional signal or multiregional television channel may refer to a signal/television channel that is broadcast to be received in multiple television markets, for instance throughout the eastern time zone of the United States. A regional signal or regional television channel may refer to a spot beam that is targeted to a specific television market. In many instances, spot beams are used to transmit local television channels to a particular television market. For example, the local affiliates of ABC, NBC, CBS, and FOX may be transmitted to a particular television market, such as the greater-Denver area, via a spot beam.

Different television channels may be transmitted using the same frequency of the transponder stream to different geographic regions. Therefore, a particular frequency can be reused for different spot beams directed to different geographic regions. For example, a spot beam targeted to the greater San Francisco area may use a same frequency as a spot beam targeted to the greater Chicago area since the geographical regions do not overlap.

FIG. 1 illustrates downlink signal 180-1 and downlink signal 180-2, being received by satellite dish 140 and distributed to television receiver 150. For a first group of television channels, satellite dish 140 may receive downlink signal 180-1 and for a second group of channels, downlink signal 180-2 may be received. Television receiver 150 may decode the received transponder streams. As such, depending on which television channels are desired to be presented or stored, various transponder streams from various satellites may be received, descrambled, and decoded by television receiver 150.

Television service provider system 110 may include a multichannel content management system (MCMS) 111. MCMS 111 may facilitate content that is distributed to a television receiver via multiple television channel streams to be presented as part of a single television channel via display device 160. For instance, a first television channel may include television programming content (e.g., a television program), while a second television channel (which may be transmitted as part of the same transponder stream, a different transponder stream of the same satellite, or a different transponder stream of a different satellite) may include other content (e.g., television commercials). Television receiver 150 may be configured to output for presentation content from both of these television channels as a single television channel. Therefore, to a user, it may appear a single television channel is being viewed, while content received as part of multiple television channels is being presented. Further detail of MCMS 111 is provided in relation to FIGS. 3A-3C.

FIG. 2 illustrates an embodiment of television receiver 200, which may be in the form of a separate device configured to be connected with a presentation device, such as a television. Embodiments of television receiver 200 can include set top boxes (STBs). As previously noted, in addition to being in the form of an STB, a television receiver may be incorporated as part of another device, such as a television or other form of display device. For example, a television may have an integrated television receiver (which does not involve an external STB being coupled with the television).

Television receiver 200 may represent television receiver 150 of FIG. 1 and may be in the form of an STB that communicates with a display device such as a television. Television receiver 200 may be incorporated as part of a television, such as display device 160 of FIG. 1. Television receiver 200 may include: processors 210 (which may include control processor 210-1, tuning management processor 210-2, and possibly additional processors), tuners 215, network interface 220, non-transitory computer-readable storage medium 225, electronic programming guide (EPG) database 230, networking information table (NIT) 240, digital video recorder (DVR) database 245 (which may include provider-managed television programming storage and/or user-defined television programming), on-demand programming 227, multichannel management database (MMD) 232, commercial database 246, user interface 250, smart card 260, decoder module 233, television interface 235, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID filters 255 may be handled by separate hardware from program map table 257.

Processors 210 may include one or more specialized and/or general-purpose processors configured to perform processes such as tuning to a particular channel, accessing and displaying EPG information from EPG database 230, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to decoder module 233 for output to a display device. Control processor 210-1 may also communicate with network interface 220 and user interface 250. Control processor 210-1 may handle incoming data from network interface 220 and user interface 250. Additionally, control processor 210-1 may be configured to output data via network interface 220.

Control processor 210-1 may contain a multichannel tuning controller 211. Based on a first television channel being selected for presentation and/or storage and received instructions and/or indications, multichannel tuning controller 211 may be configured to tune to multiple (e.g., two) television channels. Content from these multiple television channels may be output for presentation as a single television channel. For instance, a user may be unaware that content from the multiple television channels is being presented to the user as a single television channel. In some embodiments, when a user has selected a first television channel for presentation, multichannel tuning controller 211 may identify a second television channel (which may be broadcast via the same transponder or a different transponder of the same or a different satellite) which is also to be tuned to. Content from the second television channel may be output for presentation during commercial breaks on the first television channel by outputting the received feed of second channel. A user may not be made aware that a second television channel has been tuned to during the commercial breaks on the first television channel. Content from the second television channel may also be recorded and output for presentation during the commercial breaks on the first television channel.

Tuners 215 may include one or more tuners used to tune to transponders that include broadcasts of one or more television channels. In the illustrated embodiment of television receiver 200, three tuners are present (tuner 215-1, tuner 215-2, and tuner 215-3). In other embodiments, two or more than three tuners may be present, such as four, six, or eight tuners. Each tuner contained in tuners 215 may be capable of receiving and processing a single transponder stream from a satellite transponder at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be used for tuning.

Network interface 220 may be used to communicate via an alternate communication channel with a television service provider, if such communication channel is available. The primary communication channel may be via satellite (which may be unidirectional to television receiver 200) and the alternate communication channel (which may be bidirectional) may be via a network, such as the Internet. Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 2, network interface 220 may be configured to communicate via one or more networks, such as the Internet, to communicate with television service provider system 110 of FIG. 1. Information may be transmitted and/or received via network interface 220.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to EPG database 230, other non-video/audio data 231, DVR database 245, multichannel management database 232, commercial database 246, and/or on-demand programming 227. Recorded television programs may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored television programs recorded due to provider-defined timers.

EPG database 230 may store information related to television channels and the timing of programs appearing on such television channels. EPG database 230 may be stored using storage medium 225, which may be a hard drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220 and/or via satellites, such as satellites 130 of FIG. 1 via tuners 215. For instance, updates to EPG database 230 may be received periodically via satellite. EPG database 230 may serve as an interface for a user to control DVR functions of television receiver 200, and/or to enable viewing and/or recording of multiple television channels simultaneously.

The network information table (NIT) 240 may store information used by television receiver 200 to access various television channels. NIT 240 may be stored locally by a processor, such as tuning management processor 210-2 and/or by storage medium 225. Information used to populate NIT 240 may be received via satellite (or cable) through tuners 215 and/or may be received via network interface 220 from the television service provider. As such, information present in NIT 240 may be periodically updated. In some embodiments, NIT 240 may be locally-stored by television receiver 200 using storage medium 225. Generally, NIT 240 may store information about a service provider network, such as a satellite-based service provider network. Information that may be present in NIT 240 may include: television channel numbers, satellite identifiers (which may be used to ensure different satellites are tuned to for reception of desired television channels), frequency identifiers and/or transponder identifiers for various television channels. In some embodiments, NIT 240 may contain additional data or additional tables may be stored by the television receiver. For example, while specific audio PIDs and video PIDs may not be present in NIT 240, a channel identifier may be present within NIT 240 which may be used to look up the audio PIDs and video PIDs in another table, such as a program map table (PMT). In some embodiments, a PID associated with the data for the PMT is indicated in a separate table, program association table (PAT), which is not illustrated in FIG. 2. A PAT may be stored by the television receiver in a similar manner to the NIT. For example, a PMT may store information on audio PIDs, and/or video PIDs. A PMT stores data on ECM (entitlement control message) PIDs for television channels that are transmitted on a transponder stream. If, for a first television channel, multiple television channels are to be tuned to, NIT 240 and/or PMT 257 may indicate a second television channel that is to be tuned to when a first channel is tuned to; this may allow for switching to output of the second television channel for different commercials, for example.

Table 1 provides a simplified example of NIT 240 for several television channels. It should be understood that in other embodiments, many more television channels may be represented in NIT 240. NIT 240 may be periodically updated by a television service provider. As such, television channels may be reassigned to different satellites and/or transponders, and television receiver 200 may be able to handle this reassignment as long as NIT 240 is updated.

TABLE 1

| Channel | Satellite | Transponder | Secondary Channel | Secondary Satellite | Secondary Transponder |
|---------|-----------|-------------|-------------------|---------------------|-----------------------|
| 4       | 1         | 2           | —                 | —                   | —                     |
| 5       | 2         | 11          | 594               | 2                   | 10                    |
| 7       | 2         | 3           | —                 | —                   | —                     |
| 13      | 3         | 4           | 954               | 2                   | 2                     |

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program map table that indicates the PIDs for audio and video streams of television channels transmitted by that transponder.

For a particular television channel, a secondary television channel may also be listed. This secondary television channel may be in the form of a separate data stream on the same or a different transponder stream, on a same or different satellite. In some embodiments, a second tuner of a television receiver may be necessary to tune to the secondary channel. If such a tuner is available, the secondary channel may also be tuned to by the television receiver.

It should be understood that the values provided in Table 1 are for example purposes only. Actual values, including how satellites and transponders are identified, may vary. Additional information may also be stored in NIT 240.

While a large portion of storage space of storage medium 225 is devoted to storage of television programming, a portion may be devoted to storage of non-audio/video data, such as EPG database 230 and other non-video/audio data 231. This "other" data may permit television receiver 200 to function properly. In some embodiments, at least ten gigabytes are allocated to such other data. For example, if NIT 240 is stored by storage medium 225, it may be part of other non-video/audio data 231.

Multichannel management database (MMD) 232 may contain data that is used to manage multichannel tuning and content storage. MMD 232 may include subscriber attributes, such as the subscriber's location, occupation, age, income level, interests, subscription package, etc. This information may be used to target advertisements. Based on such subscriber information, different content may be presented and/or stored by storage medium 225. In some embodiments, MMD 232 may also be used to store data about a secondary television channel to which a tuner of tuners 215 should be tuned when a first television channel is being output for presentation. MMD 232 may also store instructions that indicate when content from a secondary television channel should be presented as part of a first television channel (e.g., instructions used to identify when a commercial break has begun, instructions on how to select a television commercial from content recorded from the secondary television channel). The instructions or timing information of when and what to replace commercials with may also be contained in the first television channel stream or, more generally, the transponder stream that contained the first television channel.

Commercial database 246 may be present in some embodiments. Commercial database 246 may be used to store commercials (or other forms of content) recorded from a secondary television channel for output as part of a first television channel. Therefore, while television programming is being received and output for presentation on a first television channel, content on the second television channel may be recorded, then output as part of the first television channel during a commercial break on the first television channel. In some embodiments, commercial database 246 may not be present. In such embodiments, television receiver 150 may not have a hard drive or storage medium sufficient or configured to store content. In such embodiments, rather than storing content from a secondary television channel using commercial database 246, the secondary television channel may be output for presentation live from the received transponder signal during commercial breaks on the first television channel.

Decoder module 233 may serve to convert encoded video and audio into a format suitable for output to a display device. For instance, Decoder module 233 may receive MPEG video and audio from storage medium 225 or descrambling engine 265 to be output to a television. MPEG video and audio from storage medium 224 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265 simultaneously. For instance, each of decoders 234 within decoder module 233 may be able to only decode a single television channel at a time.

While a television channel is being decoded by a decoder of decoders 234, the television channel is not necessarily output to a display device via television interface 235. For instance, a television channel may be decoded but not output to allow for seamless or near-seamless switching to the television channel when output is desired. For example, if a second television channel is to be output for presentation during commercial breaks on a first television channel, the second television channel and the first television channel may each be continuously decoded by different decoders of decoder module 233 to allow for fast switching between the channels. Without a television channel being continuously decoded, fast switching may be difficult due at least in part to the format in which the channel is encoded. For instance, for MPEG encoding, it may be necessary to first decode an I-frame before certain subsequent (or earlier) received frames can be properly decoded. The output of the decoder, which is provided to television interface 235, may be controlled by control processor 210-1 or some other processor. While decoder module 233 is illustrated as having three decoders 234 (decoder 234-1, decoder 234-2, and decoder 234-3), in other embodiments, a greater or fewer number of decoders may be present in television receiver 200.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 227 and/or information from EPG database 230) to a television for presentation.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, referring to satellite television distribution system 100 of FIG. 1, in a satellite-based television service provider system, data necessary to create the provider-defined timers at television receiver 150 may be received via satellite.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 225 for provider-managed television programming storage.

On-demand programming 227 may represent additional television programming stored by storage medium 225. On-demand programming 227 may include television programming that was not recorded to storage medium 225 via a timer (either user- or provider-defined). Rather, on-demand programming is programming provided to the television receiver directly for storage by the television receiver and for later presentation to one or more users. On-demand programming 227 may not be user-selected. As such, the television programming stored to on-demand programming storage 227 may be the same for each television receiver of a television service provider.

User interface 250 may include a remote control (physically separate from television receiver 200) and/or one or more buttons on television receiver 200 that allow a user to interact with television receiver 200. User interface 250 may be used to select a television channel for viewing, view information from EPG database 230, and/or program a timer stored to DVR database 245, wherein the timer is used to control the DVR functionality of control processor 210-1.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PMT 257, can be determined to be associated with a particular television channel. Particular data packets, referred to as entitlement control messages (ECMs), may be periodically transmitted. ECMs may be associated with another PID and may be encrypted; television receiver 200 may use smart card 260 to decrypt ECMs. Decryption of an ECM may only be possible if the user has authorization to access the particular television channel associated with the ECM. When an ECM is determined to correspond to a television channel being stored and/or displayed, the ECM may be provided to smart card 260 for decryption.

When smart card 260 receives an encrypted ECM, smart card 260 may decrypt the ECM to obtain some number of control words. In some embodiments, from each ECM received by smart card 260, two control words are obtained. In some embodiments, when smart card 260 receives an ECM, it compares the ECM to the previously received ECM. If the two ECMs match, the second ECM is not decrypted because the same control words would be obtained. In other embodiments, each ECM received by smart card 260 is decrypted; however, if a second ECM matches a first ECM, the outputted control words will match; thus, effectively, the second ECM does not affect the control words output by smart card 260. Smart card 260 may be permanently part of television receiver 200 or may be configured to be inserted and removed from television receiver 200. In some embodiments, control processor 210-1, tuning management processor 210-2, or other hardware may be able to determine that a received ECM has not changed from the previous iteration, and therefore not provide the repeated ECM to the smart card, since the same control word(s) will be obtained.

Tuning management processor 210-2 may be in communication with tuners 215 and control processor 210-1. Tuning management processor 210-2 may be configured to receive commands from control processor 210-1. Such commands may indicate when to start/stop recording a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite), a PID filter may be created based on the PMT data. The PID created, based on the PMT data packets, may be known because it is stored as part of NIT 240 or another table, such as a program association table (PAT). From the PMT data packets, PMT may be constructed by tuning management processor 210-2.

PID filters 255 may be configured to filter data packets based on PIDs. In some embodiments, PID filters 255 are created and executed by tuning management processor 210-2. For each television channel to be output for presentation or recorded, a separate PID filter may be configured. In other embodiments, separate hardware may be used to create and execute such PID filters. Depending on a television channel selected for recording/viewing, a PID filter may be created to filter the video and audio packets associated with the television channel (based on the PID assignments present in PMT 257). For example, if a transponder data stream includes multiple television channels, data packets corresponding to a television channel that is not desired to be stored or displayed by the user may be ignored by PID filters 255. As such, only data packets corresponding to the one or more television channels desired to be stored and/or displayed may be filtered and passed to either descrambling engine 265 or smart card 260; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2.

Descrambling engine 265 may use the control words output by smart card 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by smart card 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to decoder module 233 for output to a television or other presentation equipment via television interface 235.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television.

Figure 3A:
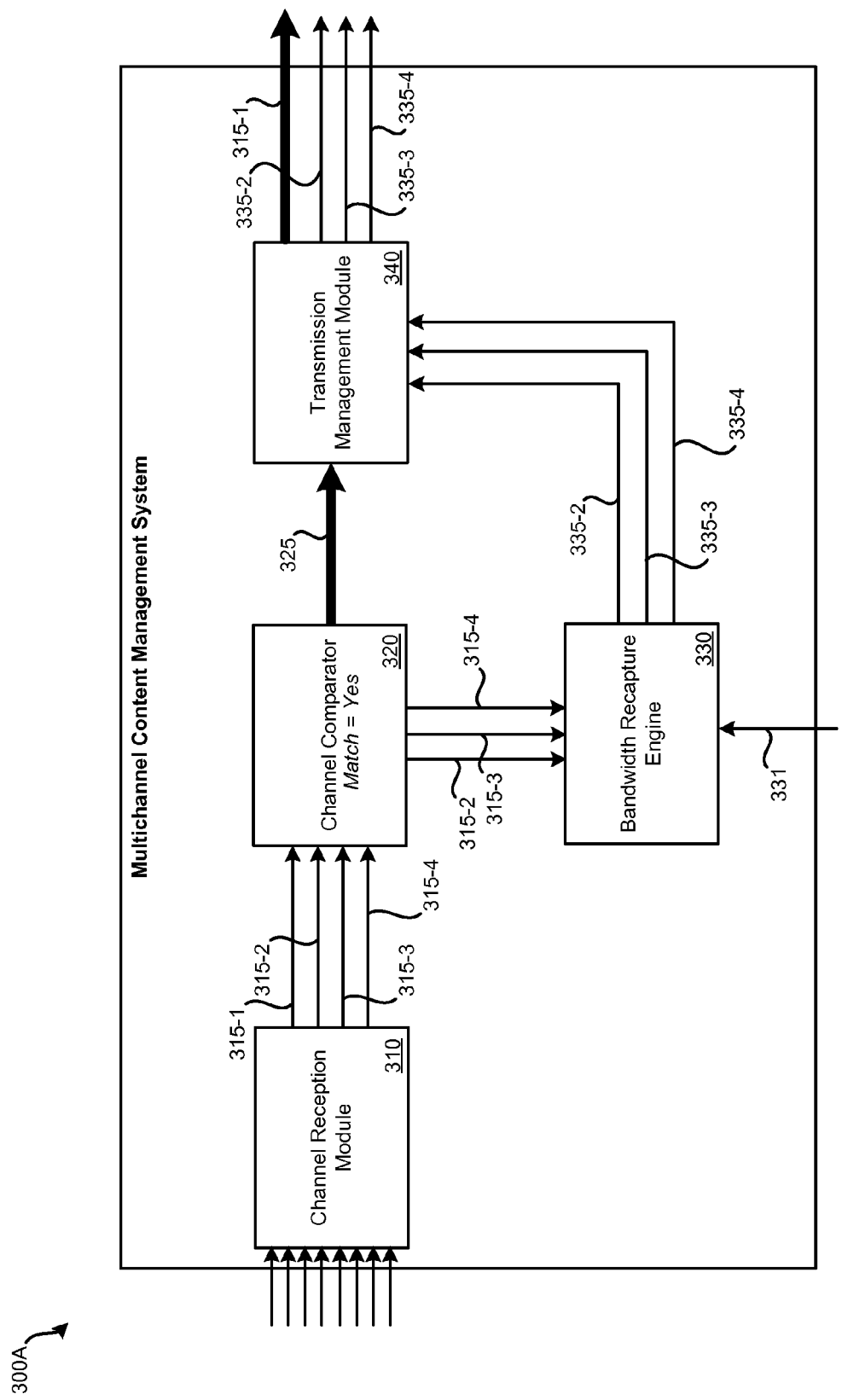
FIGS. 3A, 3B, and 3C illustrate embodiments of a multichannel content management system (MCMS) configured to manage transmission of targeted content to user equipment.

FIG. 3A illustrates an embodiment of MCMS 300A. MCMS 300A may be used to make additional bandwidth available in a satellite-based television distribution system by consolidating content being broadcast at the same time on multiple television channels. An example of a situation of where multiple television channels may be broadcasting the same content at the same time is regional affiliates of a television network (e.g., ABC, CBS, NBC, or FOX) broadcasting a same television program for different television markets (e.g., Boston-area, New York-area, Miami-area). MCMS 300A may be an embodiment of MCMS 111 of FIG. 1. MCMS 300A may be used by a television service provider to: 1) determine when it is appropriate to consolidate the broadcast of two or more television channels; 2) manage switching between a regional television channel and a multiregional television channel and/or 3) utilize additional available bandwidth to transmit data to television receivers.

Channel reception module 310 may be configured to receive multiple television channels that are to be distributed by the television service provider. Channel reception module 310 may be configured to group television channels that are considered likely to, at least for some of the time, contain the same content being broadcast at the same time. In some instances, channel reception module 310 may be configured to receive network affiliated television channels and group the network affiliated television channels by time zone and network. For instance, channel reception module 310 may group television channels associated with NBC in the eastern time zone. Groups of television channels may then be transmitted to channel comparator 320. Regional television channel 315-1, regional television channel 315-2, regional television channel 315-3, and regional television channel 315-4 may represent different television channels affiliated with the same television network possibly each located and broadcasted in the same time zone.

Channel comparator 320 may compare the received group of regional television channels 315 to determine if two or more of the content on regional television channels 315 match. For instance, content may match while a television program is broadcast, but during commercial breaks, at least some of the broadcast content may vary between regional television channels. To determine if regional television channels match, the channel comparator may compare video and/or audio of the regional television channels. In some situations, it may be possible for two television channels that are concurrently broadcasting the same television program to not match. For instance, if one of the television channels is broadcasting a weather advisory along with the television program, the video feeds for the two television channels may not match despite the same television program being broadcast. In FIG. 3A, channel comparator has determined that the group of four regional television channels 315 received by channel comparator 320 sufficiently match.

In some embodiments, channel comparator 320 performs a comparison solely on the basis of video. The video may be compared on a frame-by-frame basis. A perfect match between television channels may not be necessary; for instance, due to encoding and/or transmission, minute color and display location variances (e.g., a pixel being slightly offset in a comparison) may result in minor differences between regional television channels concurrently broadcasting the same content. As an example of a threshold-based frame-by-frame analysis which may be conducted by channel comparator 320, U.S. patent application Ser. No. 13/645,053, entitled "Frame Block Comparison", which is hereby incorporated by reference, discloses various arrangements which may be used by channel comparator 320 to determine whether two or more television channels sufficiently match. Further, it should be understood that other systems and/or methods may be employed to determine whether the video and/or audio of multiple television channels received by channel comparator 320 sufficiently match. In some embodiments, since different sets of television commercials may be used in different regions, television channels may be considered to match by channel comparator based on television programming exclusive of commercials or other content broadcast during commercial breaks.

Channel comparator 320 may output a single, multiregional television channel. The multiregional television channel output by channel comparator 320 may be a selected one of the regional television channels received by channel comparator 320. In the illustrated embodiment, regional television channel 315-1 is output by channel comparator 320 as the multiregional television channel. The regional television channel used as the multiregional television channel may contain content including: the common television programming and commercials directed to the region of the affiliated television channel being used as multiregional television channel 325.

The regional television channels 315-2, 315-3, and 315-4 which are not being used as the multiregional television channel may be routed to bandwidth recapture engine 330. From each of regional television channels 315-2, 315-3, and 315-4, the matching content may be removed or ignored by bandwidth recapture engine 330. The bandwidth previously occupied by this matching content on regional television channels 315-2, 315-3, and 315-4 may now be available for transmission of other data to television receivers. In the recaptured bandwidth, data 331 may be inserted. Data 331 may represent any form of data that is desired by the television service provider to be transmitted to one or more television receivers. For instance, referring to FIG. 2, data 331 may include on-demand content to be stored by storage medium 225 as part of on-demand programming 227. Data 331 may include non-video/audio data, such as data to update stored EPG database 230, or one or more stored tables (e.g., the NIT, PAT, PMT). In some embodiments, data 331 may include content, such as commercials, to be stored, then presented during commercial breaks (which may represent a time when the content of the regional television channels do not match). These commercials may be targeted commercials that are more relevant to the person who owns or is using the television receiver.

The modified regional television channels output by bandwidth recapture engine 330 include modified regional television channel 335-1, 335-2, and 335-3. Each of these modified regional television channels have had audio and video content removed (which matches regional television channel 315-1), and data 331 added instead to this now-available bandwidth. This arrangement can be understood as modified regional television channel 335-2, for example, being a multiplex of data from data 331 and regional television channel 315-2. Modified regional television channel 335-1 will be regional television channel 315-2 during times when the broadcast content is not the same; but will instead contain at least some of data 331 when channel comparator 320 indicates a match.

Transmission management module 340 may receive regional television channel 325 which is being used as the multiregional television channel. Transmission management module 340 may also receive the modified regional television channels 335-1, 335-2, and 335-3. Each of these television channels may be transmitted to television receivers via one or more transponders of one or more satellites. Transmission management module 340 may also create and transmit instructions to television receivers indicating to which channel, on which transponder and satellite the television receiver should tune to receive regional television channels 315. For instance, if a user desires to tune to regional television channel 315-2, based on instructions received from transmission management module 340, the television receiver may tune to regional television channel 315-1 which is serving as the multiregional television channel that is broadcasting the same content. As such, from a user's point-of-view, regional television channel 315-2 may appear to be output or stored (for instance, the television received may indicate that regional television channel 315-2 is being output), while instead the television tuner is actually outputting or storing regional television channel 315-1. At the same time, another tuner of the television receiver may be being used to receive modified regional television channel 335-2 being transmitted on the bandwidth of regional television channel 315-2. Transmission management module 340 may also transmit instructions indicating to television receivers how to handle received data 331 received as part of modified regional television channel 335-2.

Figure 3B:
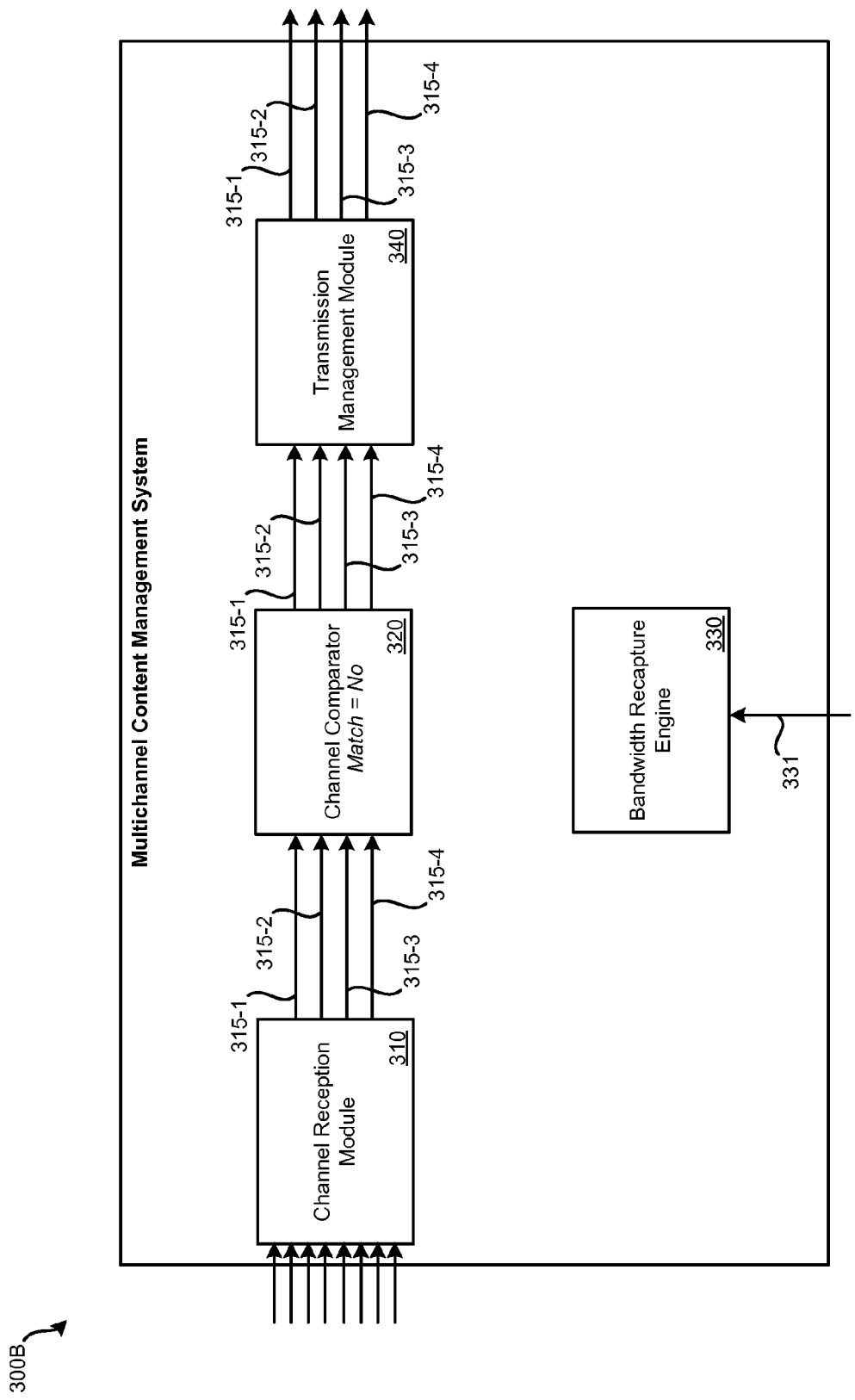

FIG. 3B illustrates an embodiment of MCMS 300B. MCMS 300B may represent MCMS 300A when content across multiple regional television channels does not match. An example of a situation of where multiple television channels may not be broadcasting the same content at the same time is when regional affiliates of a television network (e.g., ABC, CBS, NBC, or FOX) broadcasting a same television program for different television markets (e.g., Boston-area, New York-area, Miami-area) are on commercial break. For instance a local car dealership commercial may be broadcast in Boston while a local bank commercial may be broadcast in New York. MCMS 300B may be an embodiment of MCMS 111 of FIG. 1.

While channel comparator 320 of MCMS 300A of FIG. 3A determined the four regional television channels matched, channel comparator 320 of MCMS 300B of FIG. 3B has determined that the 4 regional television channels 315 do not match. This situation may occur during a commercial break of a television program being transmitted by each of the regional television channels 315. Since regional television channels 315 do not match, bandwidth recapture engine 330 may not be permitted to remove content to free bandwidth. Rather, regional television channels 315 may be provided to transmission management module 340. Transmission management module 340 may transmit the four regional television channels individually to television receivers. Transmission management module 340 may include instructions that cause television receivers to tune, decode, and output the appropriate television channel. For example, referring back to FIG. 3A, a user may have selected regional television channel 315-2 for presentation. While regional television channel 315-2 matched regional television channel 315-1, the television receiver of the subscriber may have output regional television channel 315-1 which, at the time, was being used as the multiregional television channel. When regional television channel 315-2 stops matching regional television channel 315-1, such as during a commercial break, the subscriber's television receiver may be instructed by transmission management module 340 to tune to, decode, and/or output regional television channel 315-2 (e.g., as an unrecorded live feed). This arrangement may allow a satellite-based television service provider to use a multiregional television channel for common content across multiple regional network affiliates while using individual regional television channels for region-specific content (e.g., commercials), thus resulting in an increased amount of bandwidth for data transmission to television receivers.

In some embodiments, rather than a live feed (that is, not recorded content) of regional television channel 315-2 being output when content of regional television channel 315-2 does not match regional television channel 315-1, stored recorded content, such as content that may have been received as part of data 331 may be output for presentation. This content may be selected based on the subscriber's location and/or other attributes stored about the subscriber by the television receiver. For instance the television receiver may receive an indication that a television commercial for a particular car company is to be presented. As part of data 331, two commercials for that car company have been transmitted to the television receiver. Based upon stored data about the subscriber, the commercial that is better targeted to the subscriber may be output for presentation. After a time, such as a commercial break being over, the regional television channels may again match. Thus, an arrangement such as presented by MCMS 300A may be resumed.

Figure 3C:
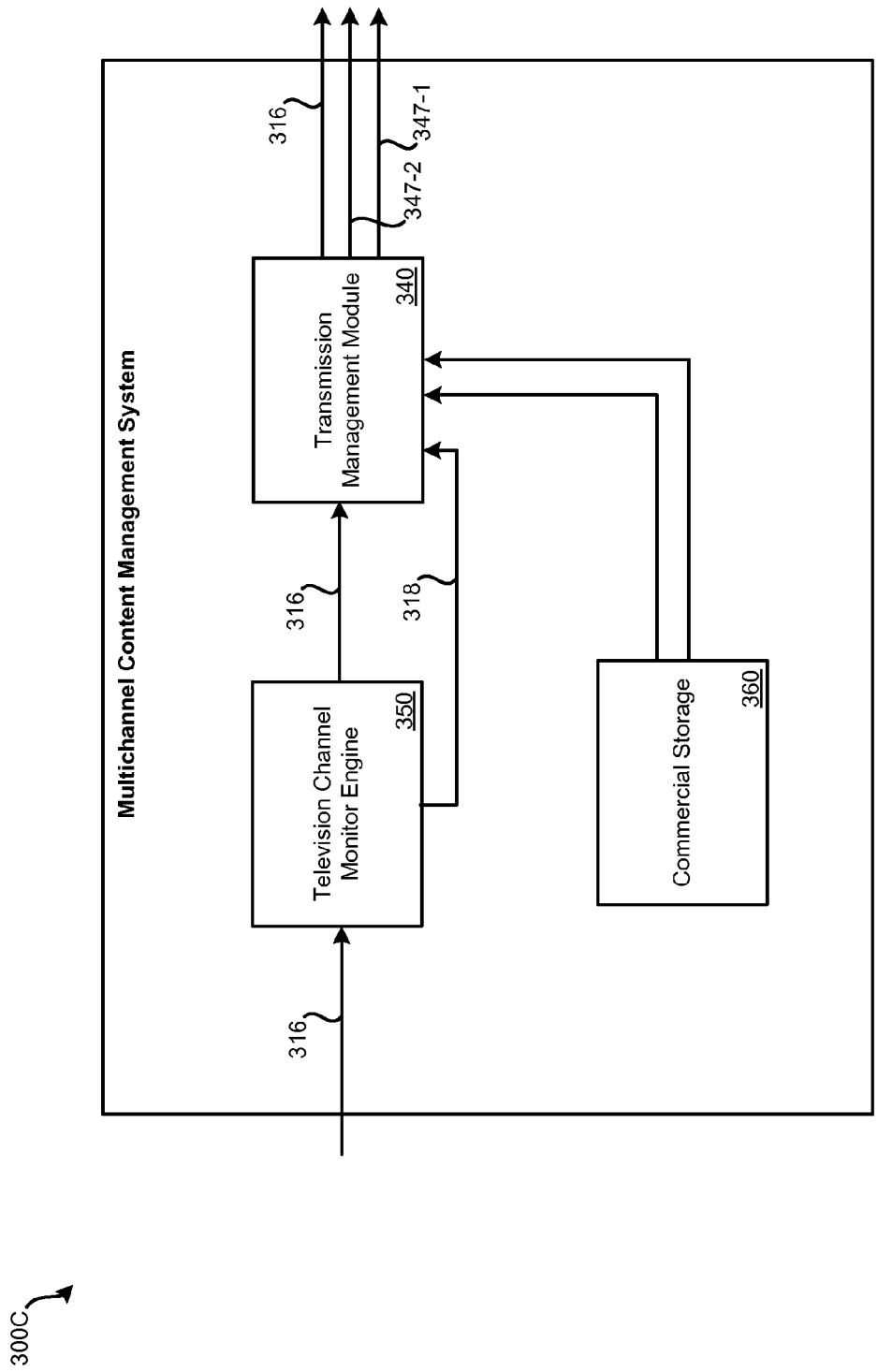

While FIGS. 3A and 3B focused on consolidation of regional affiliated television channels to free bandwidth for other data to be transmitted to television receivers, MCMS 300C in FIG. 3C is configured to: switch a television receiver between television channels based on content to be presented and/or recorded.

A stream of television channel 316 may be provided to television channel monitor engine 350. Television channel monitor engine 350 may delay transmission of television channel 316 for a short period of time by buffering television channel 316. Television channel monitor engine 350 may also monitor television channel 316 to determine when a commercial break is to begin and end. An indication of the beginning and end of commercial breaks may be provided to transmission management module 340 ahead of when these events will occur in a broadcast stream, which can be accomplished by delaying television channel 316.

Television channel 316 may be relayed to transmission management module 340, which may cause television channel 316 to be broadcast via satellite to multiple television receivers. Transmission management module 340 may insert data in the transponder stream containing television channel 316 that indicates a second television channel which should be concurrently tuned to by the television receiver. This secondary television channel may be on the same transponder or a different transponder of the same or a different satellite. Transmission management module 340 may cause indications to be transmitted to television receivers that indicate when output of television channel 316 should be switched to output of television channel 347-1 or television channel 347-2. For instance, the switch may occur during commercial breaks, thus allowing targeted television commercials based on the subscriber to be inserted into television channel 316's commercial break.

Advertisers may provide commercials to the television service provider that are stored in commercial storage 360. Based upon information about the subscriber, the subscriber's television receiver may be configured to switch to either television channel 347-1 or television channel 347-2 for output. Therefore, at a given time, a television receiver may have a tuner and decoder dedicated to television channel 316, while a second tuner and/or second decoder are dedicated to either television channel 347-1 or television channel 347-2. When an indication is received, output of the television receiver may switch to (then back) from television channel 347-1 or television channel 347-2, which may have completely different commercials or different versions of commercials by the same advertisers (thus serving as targeted advertising). The user may not be made aware of the switch. For instance, while either television channel 347-1 or television channel 347-2 is being output, the television receiver may indicate that television channel 316 is tuned to and being output.

For television receivers that are not configured to store television commercials, the television receiver may switch (based on indications received from transmission management module 340) between outputting television channel 316 and either television channel 347-1 or television channel 347-2 such that a live feed is continuously output (that is, content stored by the television receiver is not output). Such embodiments may be useful if the television receiver does not have a computer-readable storage medium sufficient to store television commercials. Television receivers that do not have a hard drive may be part of this category.

For television receivers that are configured to store television commercials, the television receiver may store commercials from television channel 347-1 and/or television channel 347-2 while a television program received and decoded from television channel 316 is output for presentation. When an indication of a commercial break is reached, stored commercials may be output by the television receiver based on attributes of the subscriber, thus targeting the subscriber. For instance, ten commercials may be transmitted to a television receiver via television channel 347-1 while television channel 316 is being output for presentation. Of these ten television commercials, only one commercial relevant to the subscriber's attributes may be stored and/or later output during a commercial break indicated by transmission management module 340. When such stored television commercials are output for presentation, it may appear to any user that the stored commercial is part of television channel 316.

Figure 4:
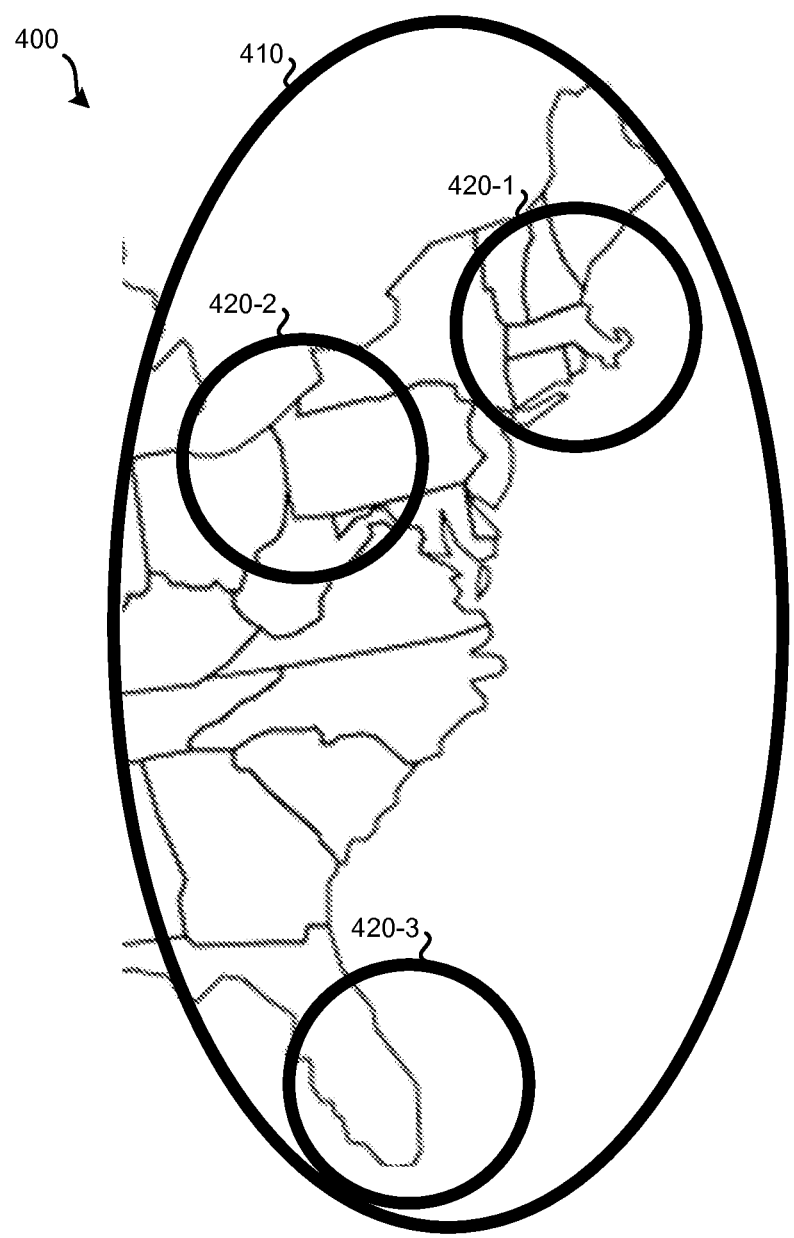
FIG. 4 illustrates an embodiment of a map of regional and multiregional satellite-broadcast television signals.

FIG. 4 illustrates an embodiment of a map 400 of regional and multiregional satellite-broadcast television channels. These television channels are transmitted via satellite using transponder streams. As previously detailed, a satellite of a satellite-based television distribution system may use transponder streams of various beam sizes to distribute television channels. As illustrated in FIG. 4, a transponder stream that includes a multiregional television channel has a coverage area 410 across the entire eastern United States. This multiregional television channel may in fact be a regional television channel that is being broadcast via satellite as a multiregional television channel. Regional television channels having coverage areas 420 may be transmitted as part of transponder streams that are spot beams targeted to specific television markets. For example, a first regional television channel for the Boston television market may be transmitted as part of a transponder stream on a spot beam having coverage area 420-1; a second regional television channel for the Pittsburgh television market may have coverage area 420-2, and a third regional television channel for the Miami television market may have coverage area 420-3 (the same frequency may be reused for some of these multiple spot beams). Each of these coverage areas 420 are at least partially within the coverage area 410.

Referring to FIG. 3A in combination with FIG. 4, coverage area 410 and coverage areas 420 may correspond to regional affiliates of a same television network. At various times throughout the day, the content broadcast on these regional affiliates may match; at other times, the content may not match. For instance, the content may match during broadcast of a television program (e.g., a sitcom) but may not match during at least a portion of commercial breaks and during local programming (e.g., the nightly news).

While the content broadcast on these multiple regional affiliates match, one of the television channels (which specific television channel may not matter since the channels have been determined to match, such as by channel comparator 320) may be broadcast to and received by television receivers as a multiregional television channel within coverage area 410. Therefore, this multiregional television channel may be received in each of coverage areas 420 (and in additional areas). To a user, it may appear the television receiver is tuned to the local regional affiliate of the television network, rather than a regional affiliate (possibly from another television market) that is serving as the multiregional television channel. For example, a Boston-area user may select viewing of the local ABC television channel having coverage area 420-1. Based on the user's selection and stored instructions received from the television service provider, the television receiver may instead tune to and output for presentation the Washington D.C. regional affiliate of ABC, which is being broadcast as the multiregional television channel (with the same content) over coverage area 410. To the user, it may appear that the television receiver is tuned to the Boston-area regional affiliate. While the regional television channels sufficiently match, the bandwidth of the spot beams used to transmit regional television signals over coverage areas 420 may be used to transmit other data to television receivers, such as described in relation to FIG. 3A.

Referring now to FIG. 3B in combination with FIG. 4, the regional television channels' content has been determined by channel comparator 320 to not match, such as during at least a portion of a commercial break, during broadcast of a region-specific emergency message, or during local programming (e.g., the evening news). In such a situation, rather than the multiregional television channel having the coverage area of 410 being used as a stand-in for multiple regional television channels, television receivers may tune to the regional television channels corresponding to their local television market based on instructions from transmission management module 340. Returning to the previous example, if a Boston-area television receiver is tuned to the local Boston-area affiliate for ABC and the content does not match the regional affiliate being broadcast as the multiregional television channel with coverage area 410, the Boston-area television receiver may be instructed to tune to a spot beam corresponding to coverage area 420-1 carrying the Boston-area specific content. Washington D.C.-area television receivers may remain tuned to the multiregional television signal because it is the Washington D.C. regional affiliate television channel, and Miami-area television receiver may be tuned to a spot beam corresponding to coverage area 420-3 (or to the multiregional television channel if the content matches). If the content again matches between the multiregional television channel having coverage area 410 and the local Boston-area affiliate having coverage area 420-1, such as when a commercial break is over, the television receivers in the Boston-area may again output for presentation the multiregional television channel corresponding to coverage area 410 based on instructions received from transmission management module 340 of an MCMS.

In the illustrated example of map 400, a multiregional signal for the multiregional television channel covers the eastern United States seacoast while spot beams cover smaller regions. It should be understood that in other embodiments, the multiregional signal may cover a smaller or larger region (and/or be differently shaped), such as the entire continental United States. In such embodiments, the multiregional signal may not be used outside of the appropriate one or more time zones. Spot beams may also be different sizes and/or shapes. For instance, the coverage area of a spot beam that targets a regional television market may be larger or smaller (and/or differently shaped). For instance, a spot beam may cover the entire eastern US seacoast, but may not be used by television receivers outside the corresponding television market.

Figure 5:
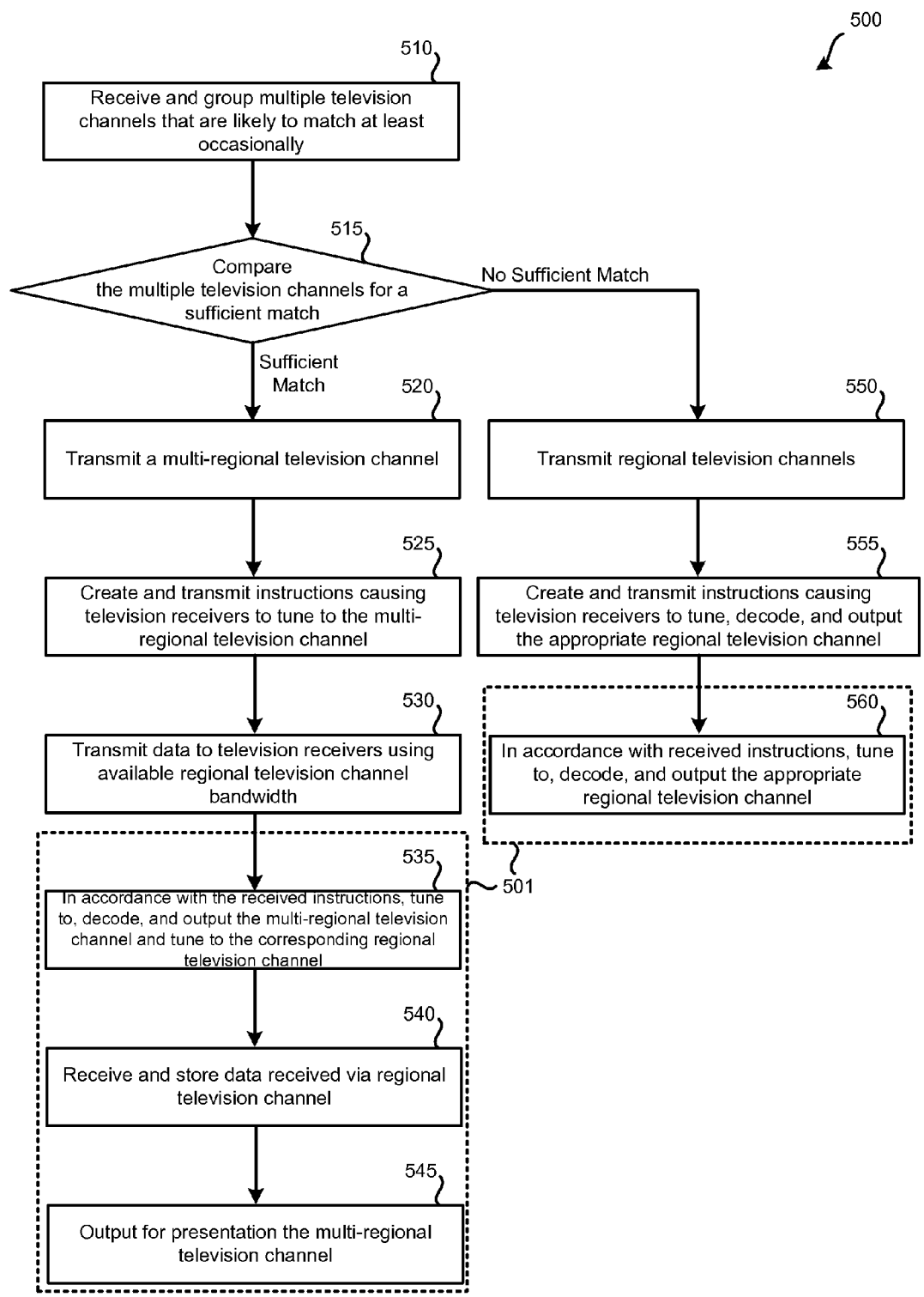
FIG. 5 illustrates an embodiment of a method for transmitting, receiving, and output for presentation content for a single television channel using a regional satellite television channel and a multiregional satellite television channel.

The systems described in relation to FIGS. 1-3 may be used to perform various methods. FIG. 5 illustrates an embodiment of method 500 for transmitting, receiving, and output for presentation content for a single television channel using a regional satellite television channel and a multiregional satellite television channel. Such an arrangement may perform for targeted television commercials for different regions. For instance, method 500 may be used in a situation where multiple regional affiliates of a national television network are broadcasting the same content at approximately the same time (e.g., the same television program is broadcast during a particular programming time slot). A portion of the content, such as at least some of the commercials broadcast during commercial breaks in television programming on the multiple regional affiliates may not match. In the embodiment of method 500 described below, only two regional television channels are detailed; it should be understood that embodiments of method 500 may be applied to more than two regional television channels. A regional television channel is defined as a television channel intended for a particular television market, such as the Boston-area. In many instances, regional television channels are local affiliates of a national television network, such as NBC, CBS, ABC, or FOX.

Method 500 may be performed using components of satellite television distribution system 100 of FIG. 1. For instances, steps of method 500 may be performed using MCMS 111. MCMS 111 may be configured similarly to MCMS 300A of FIG. 3A and MCMS 300B of FIG. 3B. Further, steps of method 500 may be performed using a television receiver, such as television receiver 200 of FIG. 2. Further, the systems, devices, and components used to perform steps of method 500 may be computerized, therefore components of computer system 800 of FIG. 8 may be used in performing method 500. Means for performing method 500 can include one or more instances of components of: satellite television distribution system 100 of FIG. 1, television receiver 200 of FIG. 2, MCMS 300A of FIG. 3A, and computer system 800 of FIG. 8. Multiple television receivers may perform steps 501.

At step 510, an MCMS of a television service provider may receive multiple regional television channels, which may be regional affiliates of a national television network, being broadcast over-the-air (OTA). A television service provider may tend to receive the broadcast of regional network affiliates via an OTA antenna in the vicinity of the regional network affiliates' television market and then rebroadcast via satellite. The television channels received may be grouped based on the affiliated television network and, possibly, time zone. For example, some or all CBS affiliates on the east coast of the United States may be grouped together. Means for performing step 510 include a channel reception module, which may contain computerized components, such as channel reception module 310 of FIG. 3A.

At step 515, a comparison between the grouped television channels is made to determine if the regional affiliates are broadcasting the same content. A perfect match may not be necessary (or likely). Rather, a sufficient match of video and, possibly, audio may be identified. For instance, a significant difference, such as a weather advisory or a different television program or commercial being presented would cause a match to not be identified. This threshold for whether a match is present may be configurable. Means for performing such a comparison may include a channel comparator, which may contain computerized components, such as channel comparator 320 of FIG. 3A.

Method 500 may proceed to step 520 if a sufficient match is determined at step 515. At step 520, one of the matching regional television channels that is designated as the multiregional television channel is transmitted. Which of the matching regional television channels is designated as the multiregional television channel may not matter since the television channels match. However, the multiregional television channel may be required to be broadcast via satellite by the television service provider throughout the multiple regions where the multiregional television channel will be used as a stand-in for the local, regional television channel. Referring to FIG. 4, the multiregional television channel may be broadcast via satellite to coverage area 410, to allow reception of the multiregional television channel throughout the eastern portion of the United States. Means for performing step 520 include one or more television distribution satellites, satellite transmitter equipment, and a transmission management module, such as transmission management module 340 of FIG. 3A, such components may be computerized.

At step 525, instructions may be created and transmitted that cause one or more television receivers to tune to the multiregional television channel. At least some of the television receivers instructed to tune to the multiregional television signal may typically be configured to tune and output for presentation a different regional television channel associated with the same television network. The instructions may indicate that while outputting for presentation the multiregional television channel, the television receiver should outwardly indicate (e.g., via an EPG display) that the regional television channel corresponding to the subscriber's region is output instead. The instructions transmitted at step 525 may also indicate that the corresponding regional television channel should be tuned to by the television receiver for reception of additional data. Means for performing step 520 include one or more television distribution satellites, satellite transmitter equipment, and a transmission management module, such as transmission management module 340 of FIG. 3A; such components may be computerized.

At step 530, data may be transmitted to one or more television receivers using the now available bandwidth that would otherwise have been devoted to the regional television channel. Referring to FIG. 3A, bandwidth recapture engine 330 may allow for other data, which may be commercials, on-demand programming, or non-video/audio data to be transmitted to the one or more television receivers using bandwidth that would otherwise have been used for the regional television channel. This data may be received by a television receiver using a same or different tuner while the multiregional television channel is being received. Also the television receiver may use a different decoder and/or display components such that the switching between video and audio sources can occur more seamlessly and/or quickly. Means for performing step 520 include one or more television distribution satellites, satellite transmitter equipment, a bandwidth recapture engine, and a transmission management module, such as bandwidth recapture engine 330 and transmission management module 340 of FIG. 3A; such components may be computerized.

At step 535, in response to the received instructions from step 525, a television receiver may tune to, decode, and output the multiregional television channel. When output for presentation, from the user's point-of-view, it may appear that the television receiver is outputting the regional television channel associated with the location of the television receiver. Therefore, for example, if the user accesses an EPG of the television receiver, it may appear that the television receiver is tuned to and outputting for presentation the local regional television channel. Since the content matches, it may not be possible for the user to determine that in fact a regional television channel from another region is being used as a multiregional television channel. For example, referring to FIG. 4, a television receiver in the immediate Boston-area (within coverage area 420-1) may typically be configured to receive a Boston-based regional affiliate of a television network. In accordance with the instructions created and transmitted at step 525, this Boston-area television receiver may be configured to use the multiregional television channel as a stand-in for the Boston-based regional affiliate of the same television network. This multiregional television channel may be associated with a different region, such as the Washington D.C. area. Means for performing step 535 include a television receiver such as described in relation to FIG. 2.

Further, at step 535, the television receiver may also tune to the regional television channel associated with the location of the television receiver in accordance with the instructions received from step 525. Tuning to the regional television channel may include tuning to the transponder stream used to transmit the regional television channel and receiving packetized data transmitted as part of the transponder stream in lieu of the matched content of the regional television channel. Such tuning to the transponder stream of the regional television channel may involve a different tuner of the television receiver being used to receive the regional television channel. In some embodiments, it may be possible to receive data for both television channels using a single tuner. Continuing with the Boston-area example, a television receiver in the Boston area may tune to the multiregional television channel having a coverage area 410 and may also have the same or different tuner configured to receive a signal having coverage area 420-1. Since the Boston area television receiver is using the multiregional television channel as a stand-in for the Boston-based regional affiliate of the television network, the satellite transponder signal bandwidth that would otherwise have been devoted to the Boston-based regional affiliate may be used to transmit data to the television receiver. Means for performing step 535 include a television receiver such as described in relation to FIG. 2.

At step 540, data received by the television receiver via the regional television channel's bandwidth is processed and/or stored. For instance, in some embodiments, this data may include commercials or another form of content that will be output for presentation by the television receiver at some other time. Means for performing step 540 include a television receiver such as described in relation to FIG. 2.

At step 545, the multiregional television channel is output for presentation by the television receiver. As previously noted, from a user's point-of-view, it may appear that the television receiver is outputting for presentation the regional television channel associated with the subscriber's region. Rather than the multiregional television channel being output for presentation, the multiregional television channel may be recorded and stored for future viewing, such as via DVR functionality of the television receiver. Means for performing step 545 include a television receiver such as described in relation to FIG. 2.

Returning to step 515, if a sufficient match is not present between the regional television channels, such as during a commercial break when commercials may vary by region, method 500 may proceed to step 550. At step 550, regional television channels may be broadcast individually. Referring to FIG. 4, coverage area 420-1 and may correspond to the regional television channel broadcast for the Boston-area while coverage area 420-2 corresponds to the regional television channel for the Pittsburgh area. The television channel being broadcast with a coverage area 410 may continue to be broadcast over coverage area 410 at step 515 but may only be used in the region associated with the regional television channel being used as the multiregional television channel. For instance, if a Washington D.C. area regional television channel is used as the multiregional television channel having coverage area 410, at step 515 the broadcast of this television channel may only be output for presentation by television receivers in the Washington D.C. television market. Therefore, at step 550, the bandwidth that was being used to transmit the data at step 530 is now being used by the regional television channel for localized content. Means for performing step 520 include one or more television distribution satellites, satellite transmitter equipment, and a transmission management module, such as transmission management module 340 of FIG. 3A; such components may be computerized.

At step 555, instructions may be created and transmitted that cause one or more television receivers to tune to the regional television channel corresponding to the television receiver's location. The instructions created and transmitted at step 555 may indicate that both the multiregional television channel and the corresponding regional television channel should be tuned to and decoded by television receiver. However, the instructions may also indicate that, while the multiregional television channels are to be decoded, only the regional television channel is to be output by the television receiver. By decoding the multiregional television channel, if a future instruction is received to output the multiregional television channel, by already having begun the decoding process the transition to output of the multiregional television channel may be faster and harder to detect by a user viewing the output. Means for performing step 555 include one or more television distribution satellites, satellite transmitter equipment, and a transmission management module, such as transmission management module 340 of FIG. 3A; such components may be computerized.

At step 560, in response to the received instructions from step 555, a television receiver may tune to, decode, and/or output for presentation the regional television channel corresponding to the television receiver's location. From the user's point-of-view, it may continue to appear that the television receiver is tuned to and outputting for presentation the same television channel as was output at step 545. Since the content matches, it may not be possible for the user to determine that in fact a regional television channel from another region is being used as a multiregional television channel. Means for performing step 560 include a television receiver such as described in relation to FIG. 2.

In some embodiments, at step 560, rather than outputting the regional television channel, content that was received and stored by the television receiver at step 540 may be output. Therefore, content that was transmitted to the television receiver while the regional television channel matched the multiregional television channel may be decoded and output for presentation when the regional television channel does not match the multiregional television channel.

Method 500 may continue by switching between the two branches of step 515 as the content broadcast on the regional television channels alternatively match and do not match. When the channels match, bandwidth is freed and used for transmitting other data to the television receivers. When the channels do not match, the bandwidth is used for distribution of the non-matching content.

Figure 6:
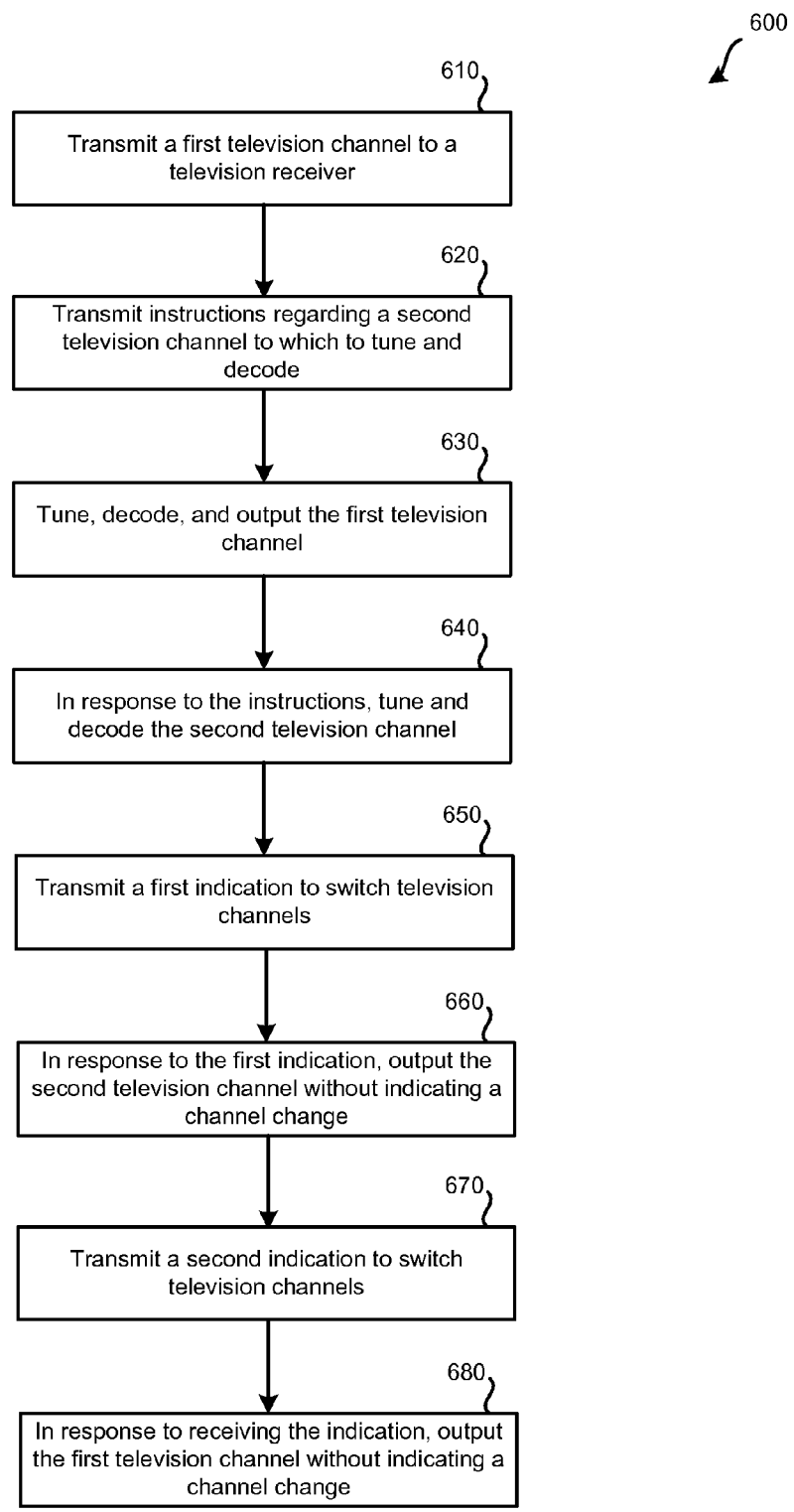
FIG. 6 illustrates an embodiment of a method for transmitting, receiving, and outputting for presentation content as a single television channel using multiple television channel streams without television receiver-based storage of content.

FIG. 6 is directed to method 600 that allows for transmitting, receiving, and outputting for presentation content as a single television channel using multiple television channel streams without television receiver-based storage of content. Method 600 does not require the use of regional and multiregional television channels; rather, method 600 involves one or more television channels being dedicated to streaming television commercials that are timed to coincide with commercial breaks on another television channel. For instance, if a first television channel has a commercial break, a television receiver may be configured to output for presentation a second or third television channel during the commercial break. Whether commercials from the second or third television channel (or commercials on the first television channel) are output may be based on attributes of the subscriber and/or television receiver.

Method 600 may be performed using components of satellite television distribution system 100 of FIG. 1. For instances, steps of method 600 may be performed using MCMS 111. MCMS 111 may be configured similarly to MCMS 300C of FIG. 3C. Further, steps of method 600 may be performed using a television receiver, such as television receiver 200 of FIG. 2. Further, the systems, devices, and components used to perform steps of method 600 may be computerized; therefore components of computer system 800 of FIG. 8 may be used in performing method 600. Means for performing method 600 can include one or more instances of components of: satellite television distribution system 100 of FIG. 1, television receiver 200 of FIG. 2, MCMS 300A of FIG. 3A, and computer system 800 of FIG. 8. In some embodiments of method 600, at least some of the television receivers involved in performing method 600 may not have a storage medium configured to store video and audio content, such as commercials or television programming. Therefore, such television receivers may not have hard drives or other large capacity non-transitory storage mediums.

At step 610, a first television channel may be transmitted to a television receiver via satellite. The television channel may be transmitted as part of a transponder stream as packetized data, with audio and video being assigned different packet identifiers. As such, broadcast of a television channel via satellite refers to transmission of the television channel as part of a digital transponder stream. At step 620, instructions may be transmitted to the television receiver that indicate that a second television channel should, in addition to the first television channel, be tuned to and decoded. The second television channel may be transmitted via the same transponder stream or a different transponder stream, via either the same satellite or a different satellite. The instructions transmitted regarding the second television channel may have been included in an updated table that is stored by the television receiver, such as an NIT (e.g., the secondary television channel identifiers in Table 1), PMT, or PAT. Means for performing steps 610 and 620 include one or more television distribution satellites, satellite transmitter equipment, and a transmission management module, such as transmission management module 340 of FIG. 3C; such components may be computerized.

At step 630, the television receiver may tune to, decode, and output the first television channel. Therefore, at step 630, a tuner of the television receiver may be dedicated to receiving a transponder stream that contains the first television channel from a television distribution satellite. A decoder of the television receiver may be configured to decode, such as from MPEG format, broadcast content for output to a display device. In response to the instructions transmitted at step 620, the television receiver may also be tuned to and decode the second television channel at step 640. However, the second television channel, while being decoded, may not be output for display. Rather, the decoded output of the second television channel may be discarded. Means for performing steps 630 and 640 include one or more television receivers, which may be computerized.

At step 650, a transmission management module of the MCMS may transmit an indication to the television receiver indicating that the second television channel should be output for display. This indication may indicate or slightly precede the beginning of a commercial break. As such, for the commercial break, the second television channel may be output for presentation by the television receiver rather than the first television channel. Means for performing step 650 include one or more television distribution satellites, satellite transmitter equipment, and a transmission management module, such as transmission management module 340 of FIG. 3C; such components may be computerized.

At step 660, in response to receiving the first indication, the second television channel may be output by the television receiver. Therefore, the decoded output of the second television channel may no longer be discarded; however, the decoded output of the first television channel may be discarded. The television receiver may not outwardly indicate that the second television channel is tuned to, decoded, and output for presentation. Therefore, to a user, it may appear that the television receiver is still outputting the first television channel. The television service provider may time the broadcast of television commercials on the second television channel to match the period of time of when the television receiver will be tuned to the second television channel. Rather than commercials filling a commercial break, step 660 may be used for other content, such as local news programming, emergency messages, etc. Means for performing step 660 include one or more television receivers, which may be computerized.

At step 670, the transmission management module of the MCMS may transmit a second indication to the television receiver indicating that the first television channel should again be output for display. This indication may indicate or slightly precede the end of the commercial break. As such, the first television channel is again output when the television programming resumes. At step 680, in response to receiving the second indication, the first television channel may be output by the television receiver. Therefore, the decoded output of the second television channel may resume being discarded. Means for performing step 670 include one or more television distribution satellites, satellite transmitter equipment, and a transmission management module, such as transmission management module 340 of FIG. 3C, such components may be computerized. Means for performing step 680 include one or more television receivers, which may be computerized.

In the above embodiment of method 600, only two television channels are discussed: the first television channel and the second television channel. It should be understood that additional television channels may also be involved in other embodiments. For example, which television channel serves as the second television channel may be selected based on attributes of the subscriber and/or television receiver. For example, different television channels on which synchronized commercials are broadcast may be targeted to different audiences. Therefore, in response to the indication of step 650, the television receiver may switch to a television channel selected from a plurality of television channels based on the attributes. In some embodiments, an additional option may also be remaining tuned to the first television channel based on the subscriber's attributes. Therefore, in response to the indication, no channel change may occur.

Figure 7:
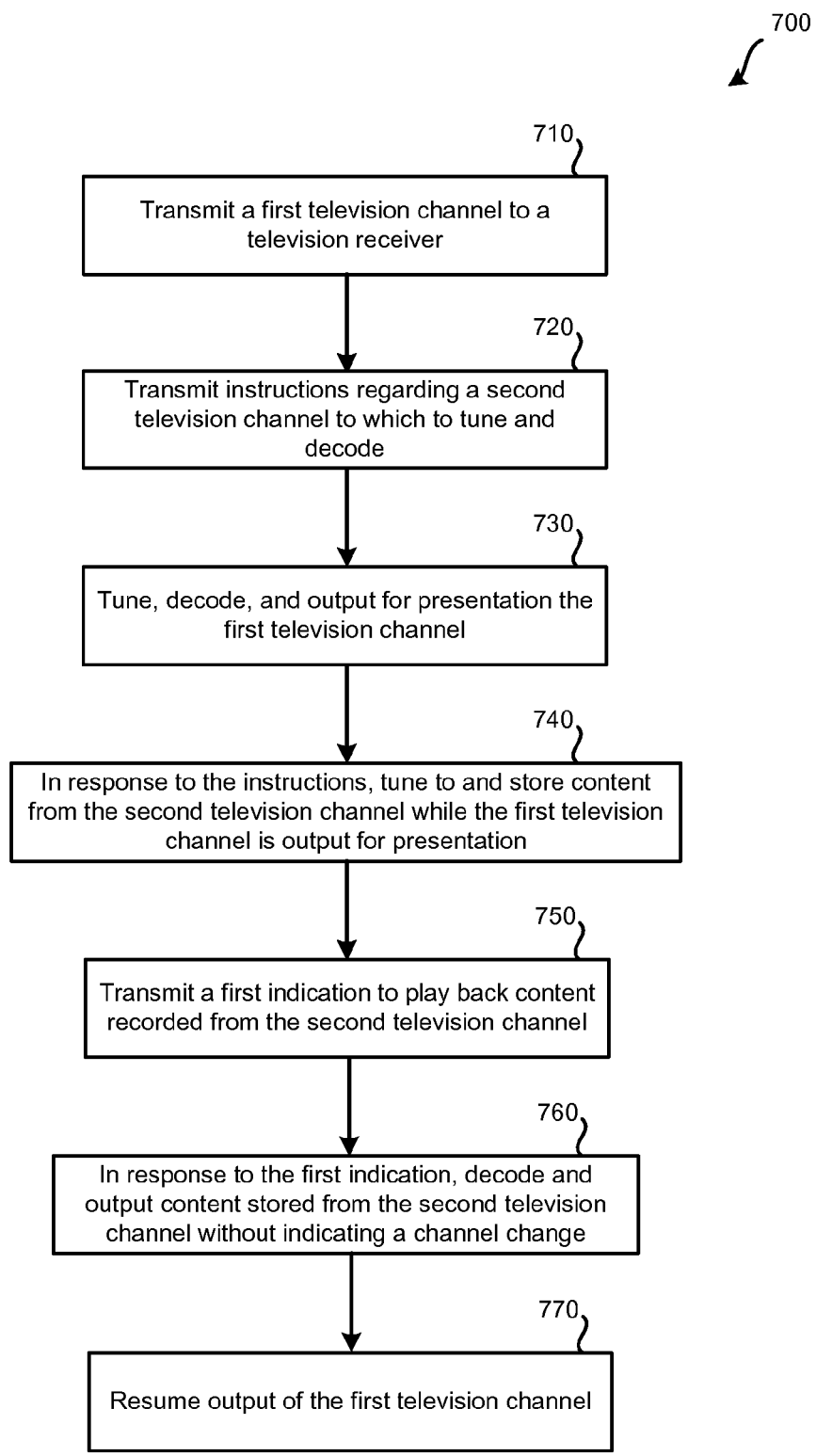
FIG. 7 illustrates an embodiment of a method for transmitting, receiving, and outputting for presentation content for a single television channel using multiple television channel streams with television receiver-based storage of content.

FIG. 7 illustrates an embodiment of a method 700 for transmitting, receiving, and outputting for presentation content as a single television channel using multiple television channel streams with television receiver-based storage of content. While a first television channel broadcasting a television program is being output for presentation to a user, content may be recorded for presentation during the commercial breaks, such as commercials specific to the television program and targeted to attributes of the subscriber. From a user's point-of-view, it may appear that the first television channel is being continuously output for presentation.

Method 700 may be performed using components of satellite television distribution system 100 of FIG. 1. For instance, steps of method 700 may be performed using MCMS 111. MCMS 111 may be configured similarly to MCMS 300C of FIG. 3C. Further, steps of method 700 may be performed using a television receiver, such as television receiver 200 of FIG. 2. Further, the systems, devices, and components used to perform steps of method 700 may be computerized, therefore components of computer system 800 of FIG. 8 may be used in performing method 700. Means for performing method 700 can include one or more instances of components of: satellite television distribution system 100 of FIG. 1, television receiver 200 of FIG. 2, MCMS 300C of FIG. 3C, and computer system 800 of FIG. 8. In some embodiments of method 700, the television receiver has a non-transitory computer-readable medium sufficient to store audio/video data, such as commercials.

At step 710, a first television channel may be transmitted to a television receiver via satellite. The television channel may be transmitted as part of a transponder stream as packetized data, with audio and video being assigned different packet identifiers. As such, broadcast of a television channel via satellite refers to transmission of the television channel as part of a digital transponder stream. At step 720, instructions may be transmitted to the television receiver that indicate that a second television channel should, in addition to the first television channel, be tuned to. (In satellite-based systems, the second television channel may be in the form of packets having PIDs that identify video and audio data present in a transponder stream. Therefore, the second television channel may be identified by an indication of a satellite, transponder, and one or more PIDs.) The second television channel may be transmitted via the same transponder stream or a different transponder stream, via either the same satellite or a different satellite. The instructions transmitted regarding the second television channel may have been included in an updated table that is stored by the television receiver, such as an NIT, PMT, or PAT. Means for performing steps 710 and 720 include one or more television distribution satellites, satellite transmitter equipment, and a transmission management module, such as transmission management module 340 of FIG. 3C; such components may be computerized.

At step 730, the television receiver may tune to, decode, and output the first television channel. Therefore, at step 730, a tuner of the television receiver may be dedicated to receiving a transponder stream that contains the first television channel from a television distribution satellite. A decoder of the television receiver may be configured to decode, such as from MPEG format, broadcast content for output to a display device. In response to the instructions transmitted at step 720, the television receiver may also tune to the second television channel at step 740. Content from the second television channel may be stored for playback at a later time. For instance, the content may be played back during a commercial break on the first television channel. Means for performing steps 730 and 740 include one or more television receivers, which may be computerized.

At step 750, a first indication may be transmitted by the MCMS of the television service provider system that indicates content from the second television channel is to be played back by a television receiver. This may occur during at the start of a scheduled commercial break on the first television channel. At step 760, in response to the first indication, content may be output for presentation that was stored from the second television channel. Content may be selected for playback based on attributes of the subscriber. (In some embodiments, the content may be selected for storage based on attributes of the subscriber and then are used for playback.) Therefore, the content output for presentation at step 760 may have been stored while step 730 is being performed. While content is being output for presentation at step 760, the user may not be aware that the first television channel is not being output. In some embodiments, the television receiver may indicate that the first television channel is being output while the stored content is being output. As such, the output content appears to be part of the first television channel. Means for performing step 750 include one or more television distribution satellites, satellite transmitter equipment, and a transmission management module, such as transmission management module 340 of FIG. 3C; such components may be computerized. Means for performing step 760 include one or more television receivers, which may be computerized.

At step 770, output of the first television channel may resume without indicating the channel change. This may occur when playback of the content indicated for playback is complete. Throughout step 760, even though locally stored television content is being output by the television receiver, the television receiver may have continued to tune to and decode the first television channel. Therefore, resuming output of the first television channel may be accomplished in a smooth fashion. Once output of the first television channel has resumed, content or some other form of data received via the second television channel may again be stored. Means for performing step 770 include one or more television receivers, which may be computerized.

Figure 8:
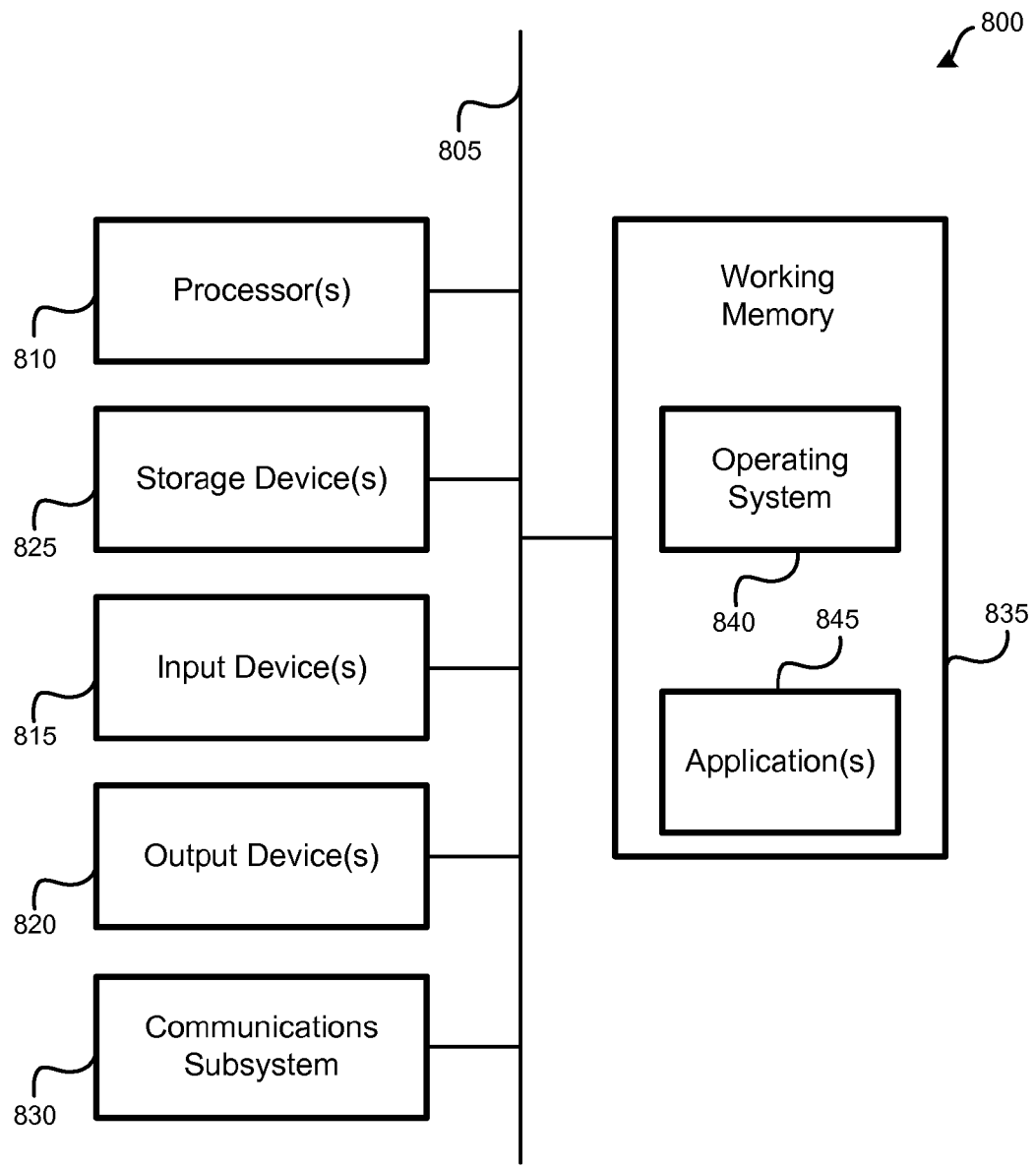
FIG. 8 illustrates an embodiment of a computer system.

A computer system as illustrated in FIG. 8 may be incorporated as part of the previously described computerized devices, such as the television service provider systems, the MCMS, and the television receivers. FIG. 8 provides a schematic illustration of one embodiment of a computer system 800 that can perform various steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, video decoders, and/or the like); one or more input devices 815, which can include without limitation a mouse, a keyboard, remote control, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810.

It should further be understood that the components of computer system 800 can be distributed across a network. For example, some processing may be performed in one location using a first processor while other processing may be performed by another processor remote from the first processor. Other components of computer system 800 may be similarly distributed. As such, computer system 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for managing satellite-based content distribution, the system comprising:

a television service provider system, comprising a multichannel content management system, the multichannel content management system configured to:

compare content of a multiregional television channel to content of a regional television channel, wherein the multiregional television channel is a designated regional television channel distinct from the regional television channel; and based on the comparison of content, determine whether content of the multiregional television channel matches content of the regional television channel;

the television service provider system being configured to:

transmit, via a non-spot beam broadcast by a first geosynchronous satellite to a first geographic region, the multiregional television channel to a plurality of television receivers;

perform a threshold-based video and audio analysis on content of the multiregional television channel and content of the regional television channel to determine if the multiregional television channel and the regional television channel match;

transmit, via a first spot beam broadcast by a second geosynchronous satellite to a second geographic region located within the first geographic region, the regional television channel to the plurality of television receivers in response to determining content of the multiregional television channel does not match content of the regional television channel, wherein:

the first spot beam and the non-spot beam are different transponder streams transmitted at different frequencies;

the frequency of the first spot beam is reused for a second spot beam for a third geographic region;

the regional television channel is broadcast by the second geosynchronous satellite to a geographically smaller region than the multiregional television channel transmitted by the first geosynchronous satellite, and content of the regional television channel varies between matching and not matching the multiregional television channel; and transmit, via the first geosynchronous satellite or the second geosynchronous satellite, data to cause the plurality of television receivers to output for presentation as a single television channel: the multiregional television channel when content of the multiregional television channel is determined by the multichannel content management system to match content of the regional television channel and the regional television channel when content of the multiregional television channel is determined by the multichannel content management system to not match the regional television channel.

2. The system for managing the satellite-based content distribution of claim 1, wherein television programming is transmitted when content of the multiregional television channel is determined by the multichannel content management system to match content of the regional television channel and locally-targeted television commercials are transmitted when content of the multiregional television channel is determined by the multichannel content management system to not match the regional television channel.

3. The system for managing the satellite-based content distribution of claim 1, wherein the multiregional television channel and the regional television channel are regional affiliates of a national television network.

4. The system for managing the satellite-based content distribution of claim 1, further comprising:
a television receiver, configured to alternatively output for presentation the multiregional television channel and the regional television channel of the plurality of regional television channels to appear as the single television channel.

5. The system for managing the satellite-based content distribution of claim 4, wherein the television receiver is further configured to:
receive the data;
store content from the regional television channel;
output for presentation the multiregional television channel; and
based on the received data, output for presentation the stored content from the regional television channel while continuing to receive and decode the multiregional television channel.

6. The system for managing the satellite-based content distribution of claim 1, wherein the television service provider system is further configured to:
transmit the multiregional television channel and the regional television channel to the plurality of television receivers via different transponders.

7. A method for managing satellite-based content distribution, the method comprising:
transmitting, via a non-spot beam broadcast by a first geosynchronous satellite to a first geographic region, a multiregional television channel to a plurality of television receivers, wherein the multiregional television channel comprises a first set of content;
performing a video and audio analysis on content of the multiregional television channel and content of a regional television channel, wherein the multiregional television channel is a designated regional television channel;
determining whether content of the multiregional television channel matches content of the regional television channel based on the video and audio analysis;
transmitting, via a first spot beam broadcast by a second geosynchronous satellite to a second geographic region located within the first geographic region, the regional television channel in response to determining content of the multiregional television channel does not match content of the regional television channel, wherein:
the first spot beam and the non-spot beam are different transponder streams transmitted at different frequencies;
the frequency of the first spot beam is reused for a second spot beam for a third geographic region;

the regional television channel is broadcast by the second geosynchronous satellite to a geographically smaller region than the multiregional television channel transmitted by the first geosynchronous satellite, and
content of the regional television channel varies between matching and not matching the multiregional television channel; and
transmitting, via the first geosynchronous satellite or the second geosynchronous satellite, data to cause the plurality of television receivers to output for presentation as a single television channel: the multiregional television channel when content of the multiregional television channel is determined by the multichannel content management system to match content of the regional television channel and regional television channel when content of the multiregional television channel is determined by the multichannel content management system to not match the regional television channel.

8. The method for managing the satellite-based content distribution of claim 7, wherein television programming is transmitted when of the multiregional television channel is determined by the multichannel content management system to match content of the regional television channel and locally-targeted television commercials are transmitted when content of the multiregional television channel is determined by the multichannel content management system to not match the regional television channel.

9. The method for managing the satellite-based content distribution of claim 7, wherein the multiregional television channel and the regional television channel are regional affiliates of a national television network.

10. The method for managing the satellite-based content distribution of claim 7, the method further comprising:
alternatively outputting, by a television receiver, for presentation the multiregional television channel and the regional television channel of the plurality of regional television channels to appear as the single television channel.

11. The method for managing the satellite-based content distribution of claim 10, the method further comprising:
receiving the data;
storing content from the regional television channel;
outputting for presentation the multiregional television channel; and
based on the received data, outputting for presentation the stored content from the regional television channel while continuing to receive and decode the multiregional television channel.

12. The method for managing the satellite-based content distribution of claim 7, the method further comprising:
transmitting the multiregional television channel and the regional television channel to the plurality of television receivers via different transponders.

13. A system for managing content distribution via a satellite system, the system comprising:
means for transmitting a multiregional television channel to a plurality of television receivers via a non-spot beam broadcast by a first geosynchronous satellite to a first geographic region, wherein:
the multiregional television channel comprises a first set of content; and
the multiregional television channel is a designated regional television channel distinct from a regional television channel;

means for performing a video and audio analysis on content of the multiregional television channel and content of the regional television channel;

means for determining whether content of the multiregional television channel matches content of the regional television channel based on the video and audio analysis;

means for transmitting the regional television channel, via a spot beam broadcast by a second geosynchronous satellite to a second geographic region located within the first geographic region, in response to determining content of the multiregional television channel does not match content of the regional television channel, wherein:

the first spot beam and the non-spot beam are different transponder streams transmitted at different frequencies;

the frequency of the first spot beam is reused for a second spot beam for a third geographic region;

the regional television channel is broadcast by the second geosynchronous satellite to a geographically smaller region than the multiregional television channel transmitted by the first geosynchronous satellite, and content of the regional television channel varies between matching and not matching the multiregional television channel; and means for transmitting data, via the first geosynchronous satellite or the second geosynchronous satellite, to cause the plurality of television receivers to output for presentation as a single television channel: the multiregional television channel when content of the multiregional television channel is determined by the multichannel content management system to match content of the regional television channel and regional television channel when content of the multiregional television channel is determined by the multichannel content management system to not match the regional television channel.

14. The system for managing content distribution via the satellite system of claim 13, wherein television programming is transmitted when of the multiregional television channel is determined by the multichannel content management system to match content of the regional television channel and locally-targeted television commercials are transmitted when content of the multiregional television channel is determined by the multichannel content management system to not match the regional television channel.

15. The system for managing content distribution via the satellite system of claim 13, wherein the multiregional television channel and the regional television channel are regional affiliates of a national television network.

16. The system for managing content distribution via the satellite system of claim 13, the system further comprising:

means for alternatively outputting for presentation the multiregional television channel and the regional television channel of the plurality of regional television channels to appear as the single television channel.

17. The system for managing content distribution via the satellite system of claim 16, the system further comprising:

means for receiving the data;

means for storing content from the regional television channel;

means for outputting for presentation the multiregional television channel; and means for outputting for presentation content from the regional television channel while continuing to decode the multiregional television channel.

18. The system for managing the satellite-based content distribution of claim 1, wherein the first geosynchronous satellite and the second geosynchronous satellite is a same satellite.

19. The method for managing the satellite-based content distribution of claim 7, wherein the first geosynchronous satellite and the second geosynchronous satellite is a same satellite.

20. The system for managing content distribution of claim 13, wherein the first geosynchronous satellite and the second geosynchronous satellite is a same satellite.

* * * * *